United States Patent
Gelberg et al.

(10) Patent No.: US 12,061,080 B1
(45) Date of Patent: Aug. 13, 2024

(54) OPTICAL-BASED VALIDATION OF PARALLELISM BETWEEN INTERNAL FACETS

(71) Applicant: LUMUS LTD., Nes Ziona (IL)

(72) Inventors: Jonathan Gelberg, Modiin (IL); Elad Sharlin, Mishmar David (IL); Eitan Ronen, Rechovot (IL)

(73) Assignee: LUMUS LTD., Nes Ziona (IL)

( * ) Notice: Subject to any disclaimer, the term of this patent is extended or adjusted under 35 U.S.C. 154(b) by 0 days.

(21) Appl. No.: 18/578,616

(22) PCT Filed: Jul. 26, 2022

(86) PCT No.: PCT/IL2022/050807
§ 371 (c)(1),
(2) Date: Jan. 11, 2024

(87) PCT Pub. No.: WO2023/007491
PCT Pub. Date: Feb. 2, 2023

Related U.S. Application Data

(60) Provisional application No. 63/225,584, filed on Jul. 26, 2021.

(51) Int. Cl.
*G01B 11/27* (2006.01)
(52) U.S. Cl.
CPC ................ *G01B 11/272* (2013.01)
(58) Field of Classification Search
CPC .................................................. G01B 11/272
(Continued)

(56) References Cited

U.S. PATENT DOCUMENTS

| | | |
|---|---|---|
| 6,580,529 B1 | 6/2003 | Amitai et al. |
| 6,671,100 B1 | 12/2003 | McRuer |

(Continued)

FOREIGN PATENT DOCUMENTS

| | | |
|---|---|---|
| CN | 102506762 A | 6/2012 |
| JP | 2015121647 A | 7/2015 |

(Continued)

OTHER PUBLICATIONS

PCT International Search Report for International Application No. PCT/IL2022/050807, mailed Nov. 30, 2022, 4pp.

(Continued)

*Primary Examiner* — Michelle M Iacoletti
*Assistant Examiner* — Omar H Nixon
(74) *Attorney, Agent, or Firm* — The Roy Gross Law Firm, LLC; Roy Gross

(57) ABSTRACT

Disclosed herein is a method for validating parallelism of internal facets of a sample. The method includes: (i) providing a sample including a light transmissive substrate and internal facets, nominally parallel and nominally inclined at an angle $\mu_{nom}$ relative to a flat surface of the sample; (ii) providing a prism having a substantially same refractive index as the substrate and including a flat, first surface and a flat, second surface, opposite to the first surface and inclined relative thereto at substantially the angle $\mu_{nom}$; (iii) positioning the sample and the prism, such that the surface of the sample is parallel and adjacent to the second surface of the prism; (iv) projecting on the first surface of the prism, substantially normally thereto an incident light beam; (v) sensing light returned from the prism following reflection off the internal facets; and (vi) computing deviation from parallelism between the internal facets.

21 Claims, 10 Drawing Sheets

(58) Field of Classification Search
USPC .......................................................... 356/138
See application file for complete search history.

(56) References Cited

U.S. PATENT DOCUMENTS

| | | | |
|---|---|---|---|
| 8,432,614 | B2 | 4/2013 | Amitai |
| 8,548,290 | B2 | 10/2013 | Travers et al. |
| 8,913,865 | B1 | 12/2014 | Bennett |
| 9,791,703 | B1 | 10/2017 | Vallius et al. |
| 10,133,070 | B2 | 11/2018 | Danziger |
| 10,962,787 | B1 | 3/2021 | Lou et al. |
| 11,667,004 | B2 | 6/2023 | Maziel et al. |
| 2007/0091445 | A1 | 4/2007 | Amitai |
| 2009/0003406 | A1 | 2/2009 | Sjogren et al. |
| 2009/0034069 | A1 | 2/2009 | Hsu |
| 2015/0338308 | A1 | 11/2015 | Li et al. |
| 2015/0338655 | A1 | 11/2015 | Sawada et al. |
| 2017/0045743 | A1 | 2/2017 | Dobschal et al. |
| 2017/0199384 | A1 | 7/2017 | Yeoh et al. |
| 2017/0363794 | A1 | 12/2017 | Wan et al. |
| 2017/0363799 | A1 | 12/2017 | Ofir et al. |
| 2017/0371160 | A1 | 12/2017 | Schultz |
| 2018/0059019 | A1 | 1/2018 | Chouaib et al. |
| 2018/0210202 | A1 | 7/2018 | Danziger |
| 2018/0246335 | A1 | 8/2018 | Ushakov |
| 2018/0284448 | A1 | 10/2018 | Matsuki et al. |
| 2019/0227215 | A1 * | 7/2019 | Danziger ............ G02B 27/0172 |
| 2019/0293838 | A1 | 9/2019 | Haba et al. |
| 2020/0148574 | A1 | 5/2020 | Schillings et al. |
| 2020/0292733 | A1 | 9/2020 | Lee et al. |
| 2021/0033774 | A1 * | 2/2021 | Tanaka ............... G02B 27/0172 |

FOREIGN PATENT DOCUMENTS

| | | | | |
|---|---|---|---|---|
| WO | 2018200913 | A1 | 11/2018 | |
| WO | 2020148574 | A1 | 7/2020 | |
| WO | WO-2021053665 | A1 * | 3/2021 | ......... G02B 27/0081 |

OTHER PUBLICATIONS

PCT Written Opinion for International Application No. PCT/IL2022/050807, mailed Nov. 30, 2022, 4pp.

* cited by examiner

464

| |
|---|
| Providing a sample to be inspected. The sample includes a light transmissive substrate, having a refractive index $n_s$, and two or more internal facets nominally parallel and inclined relative to an external and flat surface of the sample at an angle $\mu_{nom}$. |

⌐ 610

| |
|---|
| Providing an optical element having a refractive index about equal to $n_s$ and including an external and flat first surface and an external and flat second surface, which is opposite to the first surface of the optical element and inclined relative thereto at about the angle $\mu_{nom}$. |

⌐ 620

| |
|---|
| Positioning the sample and the optical element such that the second surface of the optical element is parallel and adjacent to the surface of the sample. |

⌐ 630

| |
|---|
| Projecting a plurality of incident light beams on the first surface of the optical element, about normally thereto |

⌐ 640

| |
|---|
| Obtaining a plurality of returned light beams following passage of the incident light beams through the optical element, transmission thereof into the sample and reflection off the internal facets, repassage through the optical element, and exit out of the first surface of the optical element. |

⌐ 650

| |
|---|
| Sensing the plurality of returned light beams. |

⌐ 660

| |
|---|
| Based on the sensed data, computing a deviation(s) from parallelism between the internal facets. |

OPTICAL-BASED VALIDATION OF PARALLELISM BETWEEN INTERNAL FACETS

CROSS REFERENCE TO RELATED APPLICATIONS

This application is a National Phase of PCT Patent Application No. PCT/IL2022/050807 having International filing date of Jul. 26, 2022, which claims the benefit of priority of U.S. Provisional Patent Application No. 63/225,584, filed Jul. 26, 2021, the contents of which are all incorporated herein by reference in their entirety.

TECHNICAL FIELD

The present disclosure relates generally to methods and systems for metrology of samples including internal facets.

BACKGROUND

Some optical waveguides include reflective, internal facets, which are nominally parallel. In order to validate to high precision the parallelism of such internal facets, current state-of-the-art techniques require high-end optical components. There exists an unmet need in the art for simple and easily implementable metrology techniques, which avoid the use of high-end optical components, thereby addressing mass production demands.

SUMMARY

Aspects of the disclosure, according to some embodiments thereof, relate to methods and systems for metrology of samples including internal facets. More specifically, but not exclusively, aspects of the disclosure, according to some embodiments thereof, relate to optical-based methods and systems for metrology of samples including a plurality of nominally parallel internal facets.

Reflective waveguides are employed in various displays such as head-mounted displays, head-up displays, smartphones, compact displays, 3D displays (stereo displays), as well as compact beam expanders. A reflective waveguide includes a plurality of nominally parallel internal facets across an output section of the waveguide. Light propagating (by total internal reflection) in direction of the output section from a coupling-in section of the waveguide is gradually coupled out of the waveguide through partial reflection and transmission at each of the internal facets. High parallelism between the internal facets, particularly adjacent internal facets, helps to ensure that sharp and clear images (which are not doubled or blurred) are formed on the display.

A number of methods for monitoring parallelism of internal facets in a stack of plates, prior to the dicing of the reflective waveguides into individual units, are known in the art. However, from these early stages of production until the finished product (i.e. until production of the reflective waveguide is completed), changes in the parallelism of the internal facets may well occur.

There exists an unmet need in the art for improved methods of validating parallelism of internal facets in (finished) reflective waveguides, as well as in late stages of production thereof. Advantageously, the present application discloses fast, simple, and precise methods for validating parallelism between internal facets of a reflective waveguide. The present application further discloses systems capable of implementing the disclosed methods, which advantageously avoid the use of high-end and/or complex components.

Thus, according to an aspect of some embodiments, there is provided an optical-based method for validating parallelism of internal facets of a sample. The method includes stages of:

Providing a sample including a light transmissive substrate and two or more internal facets. The substrate has a refractive index $n_s$. The internal facets are embedded within the substrate. Each of the internal facets is nominally inclined relative to an external and flat surface of the sample at an acute nominal angle $\mu_{nom}$.

Providing an optical element having a refractive index about equal to $n_s$. The optical element includes an external and flat first surface and an external and flat second surface. The second surface of the optical element is opposite to the first surface of the optical element and is inclined relative to the first surface of the optical element at about the nominal angle $\mu_{nom}$.

Positioning the sample and the optical element, such that the second surface of the optical element is parallel and adjacent to the surface of the sample.

Projecting a plurality of incident light beams on the first surface of the optical element, about normally thereto.

Obtaining a plurality of returned light beams following passage of the incident light beams through the optical element, transmission thereof into the sample and reflection off the internal facets, repassage through the optical element, and exit out of (e.g. refraction out of) the optical element via the first surface of the optical element.

Sensing the returned light beams.

Based on the sensed data, computing at least one deviation from parallelism between at least some of the internal facets.

According to some embodiments of the method, the optical element has a refractive index is equal to $n_s$.

According to some embodiments of the method, the incident light beams are projected normally to the first surface of the optical element.

According to some embodiments of the method, the stage of computing the deviation from parallelism between the internal facets includes computing angular deviations between the returned light beams.

According to some embodiments of the method, the incident light beams constitute complementary portions of an expanded light beam, which is collimated.

According to some embodiments of the method, the expanded light beam is monochromatic.

According to some embodiments of the method, the expanded light beam is an expanded laser beam.

According to some embodiments of the method, the optical element is a prism.

According to some embodiments of the method, the sample is shaped as a thin slab or an elongated box.

According to some embodiments of the method, the sample is a one-dimensional reflective waveguide or a two-dimensional reflective waveguide.

According to some embodiments of the method, the second surface of the optical element is inclined relative to the first surface of the optical element at an angle $\mu_{nom}+\Delta$. $|\Delta|$ is greater than about 0.1° and smaller than about 1°.

According to some embodiments of the method, the second surface of the optical element is inclined relative to the first surface of the optical element at the nominal angle $\mu_{nom}$.

According to some embodiments of the method, the first surface of the optical element is coated by an anti-reflective coating.

According to some embodiments of the method, the method further includes applying a liquid, which has the same refractive index as the substrate, such that the sample, the liquid, and the prism form a continuous medium.

According to some embodiments of the method, the returned light beams are sensed using an image sensor.

According to some embodiments of the method, the sensed data corresponding to each returned light beam includes measured intensities of pixels making up a spot formed by the returned light beam on the image sensor.

According to some embodiments of the method, an autocollimator is used to generate the incident light beams and focus the returned light beams.

According to some embodiments of the method, the stage of sensing the returned light beams includes viewing the returned light beams through an eyepiece. The returned light beams being manifested as spots against a graduated reticle of the eyepiece.

According to some embodiments of the method, the stage of computing the deviation from parallelism comprises computing $\varepsilon_{avg}$ and/or $\varepsilon_{max}$. $\varepsilon_{avg}$ is equal to $$\frac{1}{M}\sum_{i,j>i}\varepsilon_{ij}.$$

$\varepsilon_{max}$ is equal to to $\max\{\varepsilon_{ij}\}_{i,j>i}$ or $$\varepsilon_{ij} = \begin{cases} \sqrt{(\max\{x_i\}_i - \min\{x_i\}_i)^2 + (\max\{y_i\}_i - \min\{y_i\}_i)^2}/(2n_s \cdot f). \\ \sqrt{\sum_{k=x,y}(k_i - k_j)^2}/(2n_s \cdot f). \end{cases}$$

$\{(x_k, y_k)\}_{k=1}^N$ is a set of two-dimensional vectors specifying locations of an i-th and j-th spot on the image sensor, or against the graduated reticle of the eyepiece. N is a number of the internal facets. M is the number of distinct internal facet pairs (i.e. M=N·(N−1)/2). f is a focal length of a focusing lens or a focusing lens assembly configured to focus the returned light beams on the image sensor or onto the eyepiece.

According to some embodiments of the method, the incident light beams are consecutively projected on each of the internal facets, respectively.

According to some embodiments of the method, the consecutive projection is implemented using a translatable slitted or apertured optical mask and/or a plurality of shutters.

According to some embodiments of the method, in the computing of deviation from parallelism, deviations from parallelism between pairs of internal facets, from the plurality of internal facets, are computed.

According to some embodiments of the method, the pairs of internal facets include pairs of adjacent internal facets.

According to some embodiments of the method, the computing of the deviations from parallelism between the pairs of internal facets includes computing deviations in pitch $\{\varepsilon_{ij,\,p}\}_{i,j}$ and/or in roll $\{\varepsilon_{ij,\,r}\}_{i,j}$ between the internal facets in in each of the pairs of internal facets. The indices i and j run over distinct internal facet pairs. $\varepsilon_{ij,\,p}$ and $\varepsilon_{ij,\,r}$ are deviations in pitch and in roll, respectively, between an i-th and a j-th of the internal facets. According to some such embodiments, the $\varepsilon_{ij,\,p}$ and the $\varepsilon_{ij,\,r}$ are computed via $\varepsilon_{ij,\,p}=\delta_{ij,\,p}/(2n_s)=(x_i-x_j)/(2n_s \cdot f)$ and $\varepsilon_{ij,\,r}=\delta_{ij,\,r}/(2n_s)=(y_i-y_j)/(2n_s \cdot f)$, respectively. $\delta_{ij,\,p}$ is a deviation in pitch between an i-th of the returned light beams, induced by reflection off the i-th internal facet, and a j-th of the returned light beams, induced by reflection off the j-th internal facet. $\delta_{ij,\,r}$ is a deviation in roll between the i-th of the returned light beams and the j-th of the returned light beams. $\{(x_k, y_k)\}_{k=1}^N$ is a set of two-dimensional vectors specifying locations of the spots on the image sensor, or against the graduated reticle of the eyepiece, induced by the returned light beams. The index k labels the light beam. N is a number of the internal facets. f is a focal length of a focusing lens or a focusing lens assembly configured to focus the returned light beams on the image sensor or onto the eyepiece.

According to some embodiments of the method, the stage of computing the deviation from parallelism comprises computing a maximum deviation in pitch (i.e. a range of deviation in pitch) between the internal facets $\varepsilon_{max,\,p}=(\max\{x_i\}_i-\min\{x_i\}_i)/(2n_s \cdot f)$ and/or a maximum deviation in roll (i.e. a range of deviation in roll) between the internal facets $\varepsilon_{max,\,r}=(\max\{y_i\}_i-\min\{y_i\}_i)/(2n_s \cdot f) \cdot \{(x_i, y_i)\}_{i=1}^N$ is a set of two-dimensional vectors specifying locations (e.g. center points) of the spots on the image sensor, or against the graduated reticle of the eyepiece, induced by the returned light beams. The index i labels the spot. N is a number of the internal facets. f is a focal length of a focusing lens or a focusing lens assembly configured to focus the returned light beams on the image sensor or onto the eyepiece.

According to some embodiments of the method, wherein the sample is a reflective waveguide, the first surface of the sample and the second surface of the sample correspond to major surfaces of the waveguide. According to some such embodiments, the nominal angle $\mu_{nom}$ is smaller than 45°.

According to an aspect of some embodiments, there is provided an optical-based system for metrology of a sample having a substrate, with a refractive index $n_s$, and two or more internal facets, which are embedded in the substrate and nominally oriented at an acute nominal angle $\mu_{nom}$ relative to an external and flat surface of the sample. The system includes a light transmissive optical element and an optical setup including a light source and a light sensing component. The optical element has a refractive index about equal to $n_s$ and includes an external and flat first surface and an external and flat second surface. The first surface of the optical element and the second surface of the optical element are opposite to one another and define an inclination angle therebetween about equal to the nominal angle $\mu_{nom}$. The optical setup is configured to enable positioning the sample and/or the optical element, such that (i) the second surface of the optical element is parallel and adjacent to the surface of the sample, and (ii) when so positioned, light beams, generated by the light source, are incident on the first surface of the optical element about normally thereto. The optical setup is further configured to focus on the light sensing component returned light beams, so as to enable determination of angular deviation between the returned light beams. The returned light beams are obtained following passage of the incident light beams through the optical element, transmission thereof into the sample and reflection off the internal facets, repassage through the optical element, and exit out of (e.g. refraction out of) the optical element via the first surface of the optical element. The angular deviation thus is indicative of a deviation from parallelism between the internal facets.

According to some embodiments of the system, the optical element has a refractive index equal to $n_s$.

According to some embodiments of the system, the incident light beams are projected normally to the first surface of the optical element.

According to some embodiments of the system, the optical equipment includes a collimating lens, or a collimating lens assembly, which is configured to collimate light beams generated by the light source and thereby prepare the incident light beams.

According to some embodiments of the system, the light source is a monochromatic light source.

According to some embodiments of the system, the light source is a laser source.

According to some embodiments of the system, the optical equipment includes a focusing lens, or a focusing lens assembly, which is configured to focus the exiting light beams on the light sensing component. According to some embodiments, for example, embodiments wherein the optical setup includes an autocollimator, the focusing lens, or focusing lens assembly, is the collimating lens, or the collimating lens assembly, and may be included in the autocollimator.

According to some embodiments of the system, the second surface of the optical element is inclined relative to the first surface of the optical element at an angle equal to $\mu_{nom} + \Delta \cdot |\Delta|$ is greater than about 0.10 and smaller than about 1°.

According to some embodiments of the system, the second surface of the optical element is inclined relative to the first surface of the optical element at the nominal angle $\mu_{nom}$.

According to some embodiments of the system, the first surface of the optical element is coated by an anti-reflective coating.

According to some embodiments of the system, the optical setup includes orienting infrastructure configured for orienting the sample.

According to some embodiments of the system, the orienting infrastructure includes a pitch goniometer and a roll goniometer.

According to some embodiments of the system, the orienting infrastructure further includes an inclined platform. The inclined platform is inclined at an inclination angle about equal to the nominal angle $\mu_{nom}$. The inclined platform is configured to be mounted on the goniometers and to have placed thereon the sample.

According to some embodiments of the system, the sample is shaped as a thin slab or an elongated box.

According to some embodiments of the system, the sample is a one-dimensional reflective waveguide or a two-dimensional reflective waveguide.

According to some embodiments of the system, the optical setup further includes an autocollimator, which includes the light source and, optionally, the light sensing component.

According to some embodiments of the system, the light sensing component includes an image sensor configured to sense the returned light beams.

According to some embodiments of the system, the light sensing component is or includes a camera.

According to some embodiments of the system, the light sensing component includes an eyepiece assembly including a graduated reticle.

According to some embodiments of the system, the optical setup further includes a translatable slitted or apertured screen, and/or a plurality of shutters, configured to enable inspecting (probing) the internal facets one at a time.

According to some embodiments of the system, the system further includes a computational module configured to compute the deviation from parallelism between the internal facets based on sensed data of the returned light beams obtained by the image sensor.

According to some embodiments of the system, the sensed data pertaining to each returned light beam includes measured intensities of pixels making up a respective spot formed by the returned light beam on the image sensor.

According to some embodiments of the system, the computational module is configured to, as part of computing the deviation from parallelism between the internal facets, compute $\varepsilon_{avg}$ and/or $$\varepsilon_{max}. \ \varepsilon_{avg} \text{ is equal to } \frac{1}{M}\sum_{i}, j > i\varepsilon_{ij}. \ \varepsilon_{max} \text{ is equal to } \max\{\varepsilon_{ij}\}_i,$$

$$j > i \text{ or } \sqrt{(\max\{x_i\}_i - \min\{x_i\}_i)^2 + (\max y_i\}_i - \min\{y_i\}_i)^2}/(2n_s \cdot f)$$

Here $$\varepsilon_{ij} = \sqrt{(x_i - x_j)^2 + (y_i - y_j)^2}/(2n_s \cdot f).$$

$$\{(x_k, y_k)\}_{k=1}^N$$

being a set of two-dimensional vectors specifying locations of an i-th and j-th spot on the image sensor. N is a number of the internal facets. M is the number of distinct internal facet pairs (i.e. $M=N\cdot(N-1)/2$). f is a focal length of a focusing lens or a focusing lens assembly configured to focus the returned light beams on the image sensor.

According to some embodiments of the system, wherein the optical setup further includes the translatable slitted or apertured optical mask and/or the plurality of shutters, the computational module is configured to compute deviations from parallelism between pairs of internal facets from the plurality of internal facets.

According to some embodiments of the system, the pairs of internal facets include pairs of adjacent internal facets.

According to some embodiments of the system, the computational module is configured to, as part of computing deviations from parallelism between pairs of internal facets, compute deviations in pitch and/or in roll between the pairs of the internal facets.

According to some embodiments of the system, the computing of the deviations from parallelism between the pairs of internal facets includes computing deviations in pitch $\{\varepsilon_{ij,\ p}\}_{i,j}$ and/or in roll $\{\varepsilon_{ij,\ r}\}_{i,j}$ between the internal facets in in each of the pairs of internal facets. The indices i and j run over distinct internal facet pairs. $\varepsilon_{ij,\ p}$ and $\varepsilon_{ij,\ r}$ are deviations in pitch and in roll, respectively, between an i-th and a j-th of the internal facets. According to some such embodiments, the $\varepsilon_{ij,\ p}$ and the $\varepsilon_{ij,\ r}$ are computed via $\varepsilon_{ij,\ p} = \delta_{ij,\ p}/(2n_s) = (x_i - x_j)/(2n_s \cdot f)$ and $\varepsilon_{ij,\ r} = \delta_{ij,\ r}/(2n_s) = (y_i - y_j)/(2n_s \cdot f)$, respectively. $\delta_{ij,\ p}$ is a deviation in pitch between an i-th of the returned light beams, induced by reflection off the i-th internal facet, and a j-th of the returned light beams, induced by reflection off the j-th internal facet. $\delta_{ij,\ r}$ is a deviation in roll between the i-th of the returned light beams and the j-th of the returned light beams. $\{(x_k, y_k)\}_{k=1}^N$ is a set of two-dimensional vectors specifying locations of the spots on the image sensor induced by the returned light beams. The index k labels the light beam. N is a number of the internal facets.

f is a focal length of a focusing lens or a focusing lens assembly configured to focus the returned light beams on the image sensor.

According to some embodiments of the system, the computational module is configured to, as part of computing the deviation from parallelism between the internal facets, compute a maximum deviation in pitch (i.e. a range of deviation in pitch) between the internal facets $\varepsilon_{max, p} = (\max\{x_i\}_i - \min\{x_i\}_i)/(2n_s \cdot f)$ and/or a maximum deviation in roll (i.e. a range of deviation in roll) between the internal facets $\varepsilon_{max, r} = (\max\{y_i\}_i - \min\{y_i\}_i)/(2n_s \cdot f)$. $\{(x_i, y_i)\}_{i=1}^N$ is a set of two-dimensional vectors specifying locations (e.g. center points) of the spots on the image sensor induced by the returned light beams. The index i labels the spot. N is a number of the internal facets. f is a focal length of a focusing lens or a focusing lens assembly configured to focus the returned light beams on the image sensor.

According to some embodiments of the system, wherein the sample is a reflective waveguide, the first surface of the sample and the second surface of the sample correspond to major surfaces of the waveguide. According to some such embodiments, the nominal angle $\mu_{nom}$ is smaller than 45°.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 6 presents a flowchart of an optical-based method for metrology of internal facets of samples, according to some embodiments.

DETAILED DESCRIPTION

Figure 1A:
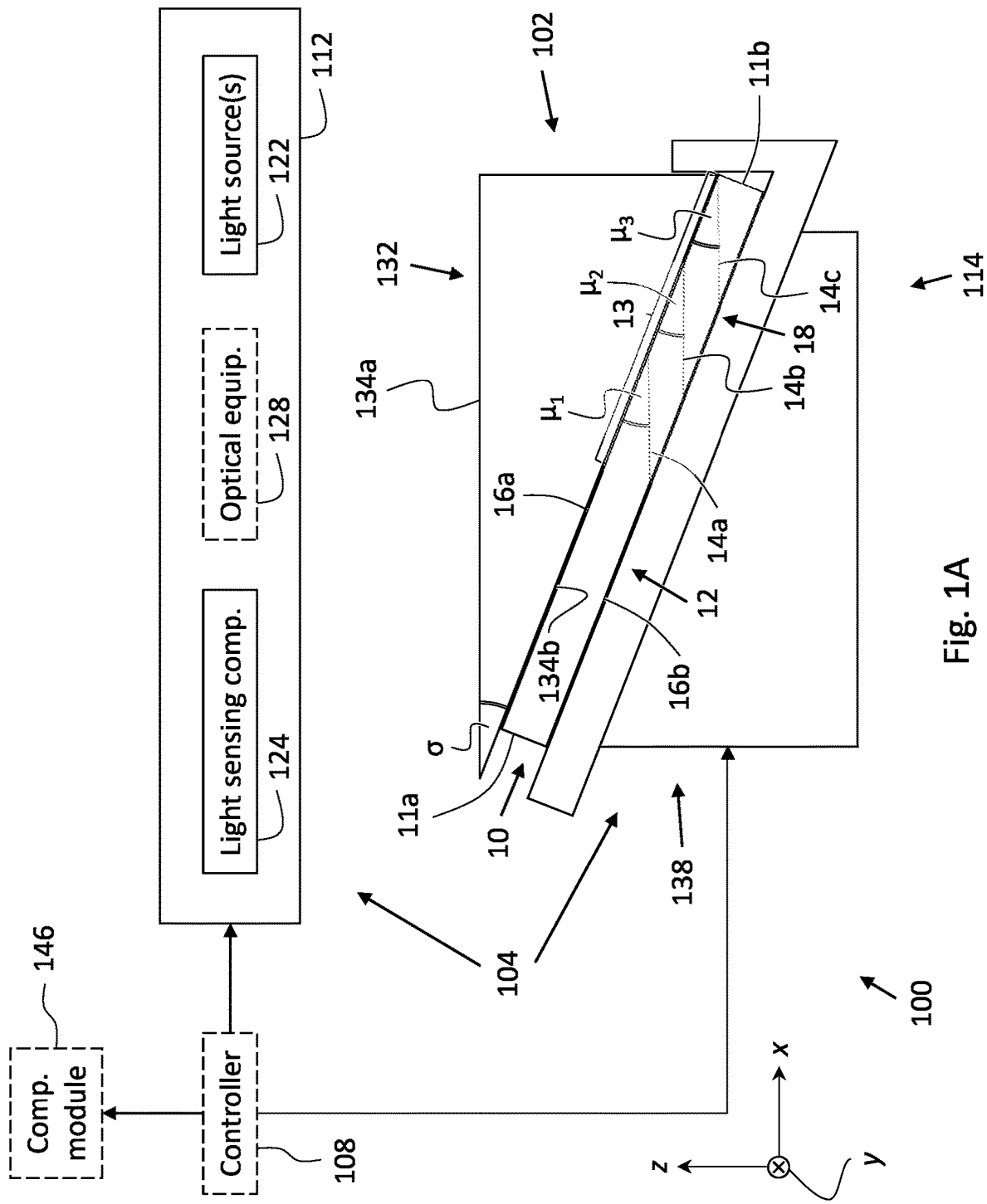
FIG. 1A schematically depicts an optical-based system for metrology of internal facets of samples and a sample mounted on the system, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value. In particular, it is to be understood that the terms "about equal" and "equal to about" also cover exact equality.

As used herein, according to some embodiments, the terms "substantially" and "about" may be interchangeable.

For ease of description, in some of the figures a three-dimensional cartesian coordinate system is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In the figures, optional elements and optional stages (in flowcharts) are delineated by a dashed line.

Throughout the description, vectors are represented by lowercase, upright letters in boldface (e.g. v).

The description includes quantitative relations between parameters in the form of equations. Consequently, to render the description clearer, throughout the description, certain symbols are used exclusively to label specific types of parameters and/or quantities. The vector "u" (including when superscript and/or subscripted) signifies a two-dimensional vector specifying coordinates of spots (e.g. on an image sensor). The Greek letter "ε" (including when superscript and/or subscripted) signifies an angle between planes or a magnitude of the angle. More specifically, the Greek letter "ε" is used to signify a deviation from parallelism between a pair of internal facets of a sample or a magnitude of a deviation from parallelism. The Greek letter "δ" (including when superscript and/or subscripted) signifies an angle between two vectors or a magnitude of an angle between two vectors. More specifically, the Greek letter "δ" is used to signify an angular deviation between the directions of propagation of two light beams. "$n_s$" signifies the refractive index of a sample inspected using the disclosed systems and/or methods. "f" signifies the focal length of a focusing lens or lens assembly used to focus returned light beams on a light sensing component included in a disclosed system used to inspect a sample and/or used as part of a disclosed method used to inspect a sample. Thus, the symbols u, ε, δ, $n_s$, and f (as well as the symbols "μ", "σ", and "Δ", which signify angles) should not be considered as being tied to a specific embodiment with respect to which they are first introduced in the text. In particular, specification of values, ranges of values, and/or constraints on the values (of components) of u and the parameters ε, δ, $n_s$, and f (as well as the parameters μ, σ, and Δ) in the context of one embodiment does not necessarily carry over to another embodiment.

Throughout the description, internal, flat surfaces (such as a flat boundary between two parts of a three-dimensional element or an internal flat layer of material incorporated into a three-dimensional element) of three-dimensional elements are referred to as "internal facets".

As used herein, an object may be said to "nominally" exhibit (i.e. be characterized by) a property, such as an inclination angle between flat surfaces of the sample, when the object is intended by design and fabrication to exhibit the property but, in practice, due to manufacturing tolerances, the property may actually be imperfectly exhibited.

Systems

According to an aspect of some embodiments, there is provided an optical-based system for metrology of internal facets in samples. FIG. 1A schematically depicts such a system, an optical-based system 100, according to some embodiments. Optical-based system 100 is configured for validating parallelism between internal facets of a sample. More specifically, FIG. 1A presents a cross-sectional side-view of system 100 and a sample 10, according to some embodiments. (It is to be understood that sample 10 does not constitute a part of system 100.)

Sample 10 includes a substrate 12 which is light transmissive, and two or more internal facets 14 inside (i.e. embedded in) the substrate. sample 10 includes an external first surface 16a (also referred to as the "sample first surface"). Sample first surface 16a may be flat. According to some embodiments, each of internal facets 14 may be a thin semi-reflective or reflective layer embedded within substrate 12. According to some embodiments, one or more of internal facets 14 may be a thin film or a partial mirror. According to some embodiments, one or more of internal facets may be or include a glass layer and/or a dielectric coating. According to some embodiments, substrate 12 may be a one-dimensional or a two-dimensional reflective waveguide (also termed "geometrical waveguide"), in which case sample 10 may include an external and flat second surface 16b (also referred to as the "sample second surface") opposite and parallel to sample first surface 16a. According to some embodiments, wherein sample 10 is a reflective waveguide, sample first surface 16a and sample second surface 16b may correspond to major surfaces of the waveguide. According to some embodiments, substrate 12 may be made of glass, crystal, or a transparent polymer.

Figure 1B:
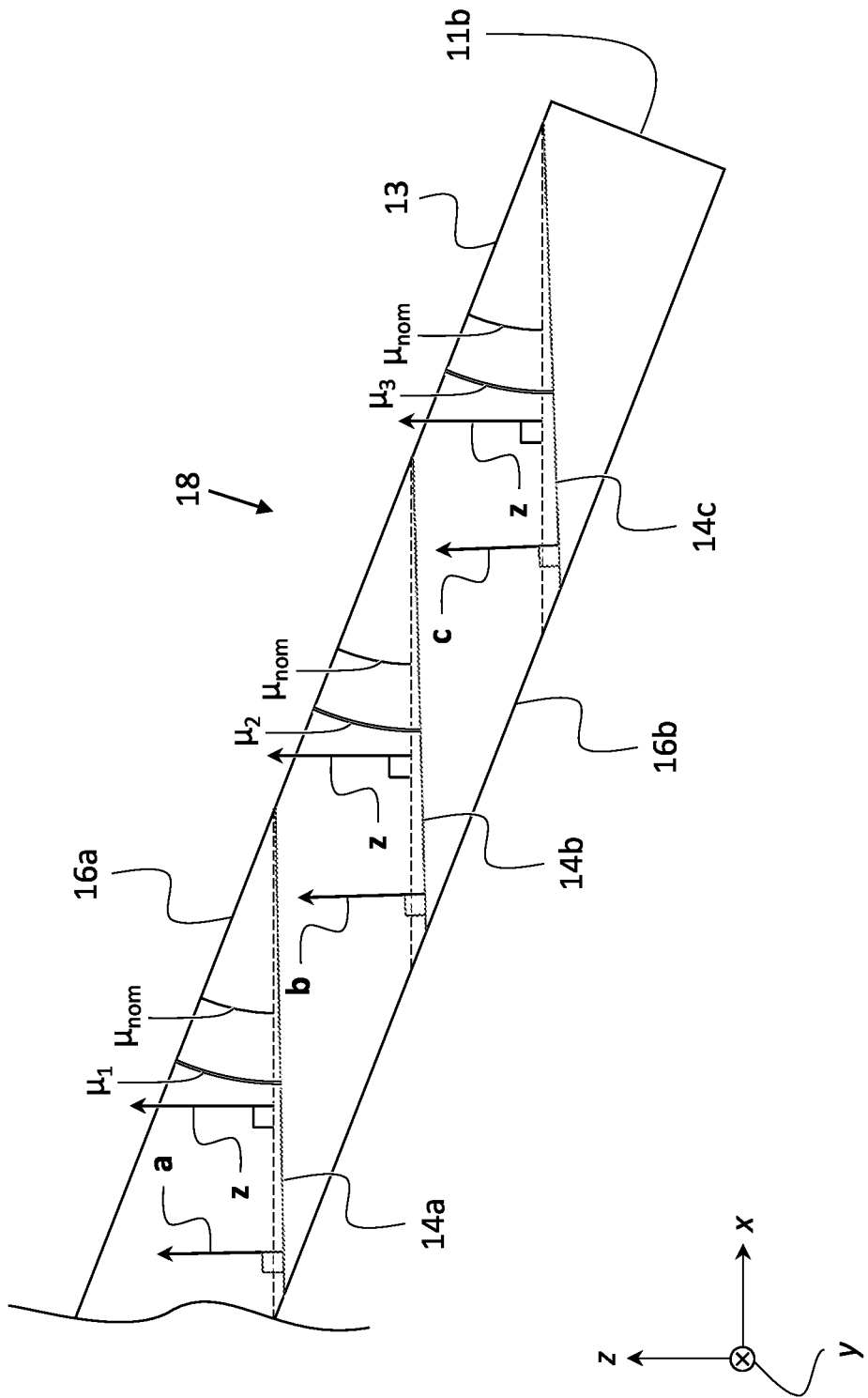
FIG. 1B is a cross-sectional view of a section of the sample of FIG. 1A, according to some embodiments.

An output section 18 of sample 10 corresponds to the portion (e.g. segment) of substrate 12 in which internal facets 14 are located (while the section of substrate, which is complementary to output section may be devoid of any of internal facets 14). Referring also to FIG. 1B, FIG. 1B provides an enlarged view of output section 18, according to some embodiments. As a non-limiting example, intended to facilitate the description, in FIGS. 1A and 1B internal facets 14 are shown as including three internal facets: a first internal facet 14a, a second internal 14b, and a third internal facet 14c. Second internal facet 14b is disposed between first internal facet 14a and third internal facet 14c. The skilled person will readily recognize that the three-internals facet case encompasses the essentials of any number of internal facets (e.g. 4, 5, 10, or more).

Figure 1C:
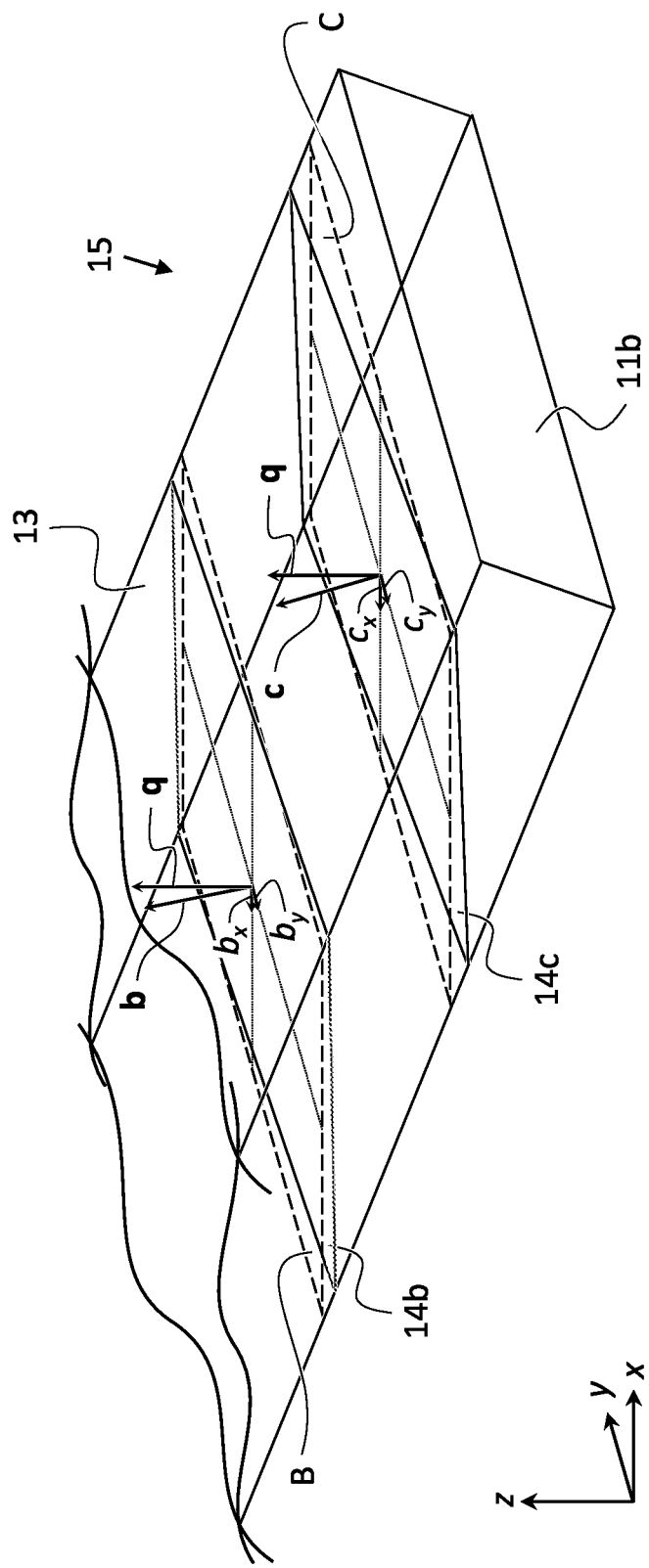
FIG. 1C is a perspective view of an end portion of the sample of FIG. 1A, according to some embodiments.

Referring also to FIG. 1C, FIG. 1C provides a perspective view of an end portion 15 of sample 10, which includes second internal facet 14b and third internal facet 14c, according to some embodiments. The nominal orientations of second internal facet 14b and third internal facet 14c are illustrated by a plane B and a plane C (outlined by dashed lines), respectively. (Planes B and C are each parallel to the xy-plane.)

Internal facets 14 are nominally parallel. That is, according to the intended design of sample 10 internal facets 14 are parallel. In actuality, due to fabrication imperfections, internal facets 14 may typically not exhibit perfect parallelism. According to some embodiments, each of internal facets 14 is nominally inclined at a nominal angle $\mu_{nom}$ relative to sample first surface 16a. However, in actuality, each of internal facets 14 may be oriented at a respective actual angle, which slightly differs from the nominal angle $\mu_{nom}$. First internal facet 14a, second internal facet 14b, and third internal facet 14c are oriented at a first actual angle $\mu_1$, a second actual angle $\mu_2$, and a third actual angle $\mu_3$, respectively, relative to sample first surface 16a. It is noted that due to fabrication imperfections, the actual angles $\mu_i$ (i=1, 2, 3) may differ from one another, and/or the nominal angle $\mu_{nom}$, not only in magnitude but also by the respectively subtending planes. For example, if the nominal angle is subtended on a first plane parallel to the zx plane, $\mu_1$ may be subtended on a second plane, which is tilted with respect to the first plane. Similarly, $\mu_2$ may be subtended on a third plane, which is tilted with respect to the first plane and/or the second plane. Put differently, denoting by a, b, and c unit vectors normal to first internal facet 14a, second internal facet 14b, and third internal facet 14c, respectively, most generally, a≠b, b≠c, and c≠a, wherein it is assumed that in the absence of fabrication imperfections, a=b=c=ẑ. Here ẑ denotes a unit vector in the direction of the z-axis.

As used herein, the "pitch of an internal facet" refers to the angle by which the internal facet is rotated about they-axis relative to the nominal orientation thereof. The "roll of an internal facet" refers to the angle by which the internal facet is rotated about the x-axis relative to the nominal orientation thereof.

Indicated on plane B are $b_x$ and $b_y$: the x and y components, respectively, of b. Second internal facet 14b is shown as being tilted with respect to plane B in both pitch and roll, as evinced by $b_x$ and $b_y$, respectively, each being non-vanishing. Indicated on plane C are cx and cy: the x and y components, respectively, of c. Third internal facet 14c is shown as being tilted with respect to plane C in both pitch and roll, as evinced by $c_x$ and $c_y$, respectively, each being non-vanishing. In addition, second internal facet 14b and third internal facet 14c are shown as differing from one another in both pitch and roll (i.e. in FIG. 1C $c_x > b_x$ and $c_y > b_y$).

Each of sample first surface 16a and sample second surface 16b extends from first end 11a to second end 11b of a sample 10. Output section 18 defines an output area 13 on sample first surface 16a. According to some embodiments, sample 10 may be configured such that light, propagating in the direction of second end 11b, will exit sample 10 through output area 13 after reflection by internal facets 14.

According to some embodiments, system 100 includes an optical element 102, which is light transmissive, and an optical setup 104. System 100 may further include a controller 108 functionally associated with optical setup 104 and configured to control operation thereof. According to some embodiments, and as depicted in FIG. 1A, optical setup 104 includes an illumination and collection assembly (ICA) 112 and a holding infrastructure 114 for mounting thereon sample 10. According to some embodiments, and as elaborated on below, holding infrastructure 114 may include or constitute an orienting infrastructure configured to allow controllably setting an orientation of sample 10. ICA 112 includes a light source 122 (or a plurality of light sources) and a light sensing component 124. According to some embodiments, light sensing component 124 may include an image sensor. According to some embodiments, the image sensor may be a CCD sensor or a CMOS sensor. According to some embodiments, light sensing component 124 may be a camera. Alternatively, according to some embodiments, light sensing component 124 may be or include an eyepiece assembly, which is configured for visual determination (i.e. by eye) of deviation between light rays focused onto the eyepiece assembly. According to some embodiments, ICA 112 may further include optical equipment 128 whose function is described below.

Optical element 102 includes a substrate 132, which constitutes the bulk of optical element 102 and which is made of a material having about the same refractive index as substrate 12 (e.g. to within of ±0.02 of the value of the refractive index). Optical element 102 further includes an external first surface 134a (e.g. a first surface of substrate 132, which is external; also referred to as "optical element first surface") and an external second surface 134b (e.g. a second surface of substrate 132, which is external; also referred to as "optical element second surface"). According to some embodiments, and as depicted in FIG. 1A, optical element first surface 134a and optical element second surface 134b are flat. According to some embodiments, optical element 102 is a prism. According to some such embodiments, the prism may be a triangular prism.

Figure 1D:
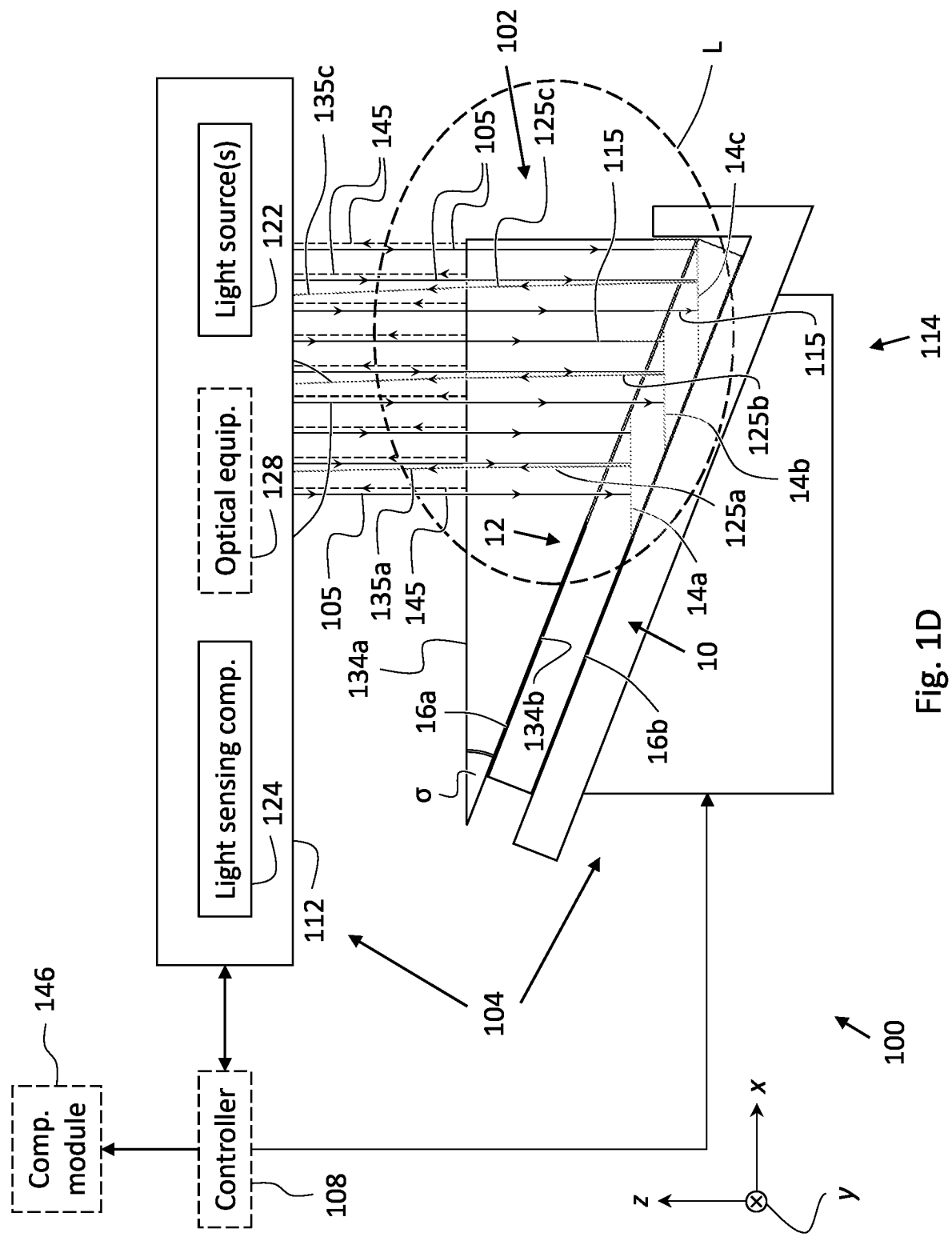
FIG. 1D schematically depicts the system of FIG. 1A in operation, during an inspection of the sample, according to some embodiments.

As shown in FIGS. 1C and 1D, and described in detail below, optical element 102 is configured such that (at least some of) light incident on optical element first surface 134a, sufficiently centrally on optical element first surface 134a and at an incidence angle sufficiently close to 0°, exits optical element 102 via (i.e. through) optical element second surface 134b. More specifically, optical element 102 is configured such that (at least some of) light normally incident on optical element first surface 134a, and transmitted thereby into optical element 102, will travel through optical element 102 and impinge on optical element second surface 134b at an incidence angle about equal to the nominal inclination angle $\mu_{nom}$.

According to some embodiments, optical element second surface 134b may be inclined at the nominal inclination angle $\mu t_{nom}$ relative to optical element first surface 134a (i.e. $\sigma = \mu_{nom}$). Alternatively, according to some embodiments, and as elaborated on below, $\sigma = \mu_{nom} + \Delta$, wherein $0.3° \le |\Delta| \le 0.5°$, $0.2° \le |\Delta| \le 0.7°$, or even $0.1° \le |\Delta| \le 1°$. Each possibility corresponds to separate embodiments.

ICA 112 is configured to output a collimated light beam (as shown in FIGS. 1C and 1D), which is produced by light source 122, and, optionally, manipulated (e.g. collimated) by optical equipment 128 (in embodiments including optical equipment 128). According to some embodiments, optical equipment 128 may include a collimating lens or a collimating lens assembly (not shown). Optical element 102 and ICA 112 (more precisely, illumination components of ICA 112) relative orientation may be set such that the light beam output by ICA 112 impinges on optical element first surface 134a normally (or at least substantially normally) to optical element first surface 134a. According to some embodiments, light source 122 may be configured to produce a monochromatic light beam (and the light beam output by ICA 112 is monochromatic). According to some embodiments, light source 122 may be a laser source (and the light beam output by ICA 112 is a laser beam). According to some embodiments, wherein light source 122 is a laser source, ICA 112 may be configured to output an expanded laser beam, which is collimated. According to some such embodiments, optical equipment 128 may include a beam expander (not shown) configured to increase the diameter of the laser beam. According to some embodiments, such as when sample 10 is a one-dimensional reflective waveguide, a diameter of the expanded laser beam (e.g. the longest diameter when the cross-section of the expanded laser beam defines an ellipse) may be about equal to a longitudinal dimension of output area 13. According to some embodiments, such as when sample 10 is a two-dimensional reflective waveguide, a cross-sectional area of the expanded laser beam may be of a size about equal to that of output area 13.

According to some embodiments, light source 122, light sensing component 124, and at least some of optical equipment 128, may include an autocollimator or include components of an autocollimator. According to some embodiments, the autocollimator is a digital autocollimator or an electronic autocollimator. According to some embodiments, the autocollimator is a laser autocollimator. According to some embodiments, the autocollimator is a visual autocollimator. According to some embodiments, light source 122, and at least some of optical equipment 128 may constitute an autocollimator or constitute components of an autocollimator, which is attached to a camera constituted by light sensing component 124.

According to some embodiments, optical equipment 128 may further include a translatable slitted or apertured optical mask (not shown; such as the translatable optical mask of FIG. 2) configured to control an incidence (i.e. impinging, striking) location of a light beam (e.g. a laser beam) on optical element first surface 134a, thereby allowing to separately inspect each of internal facets 14. Alternatively, according to some embodiments, optical equipment 128 may further include a plurality of shutters configured to allow separate inspection of each of internal facets 14.

According to some embodiments, holding infrastructure 114 may be configured to allow controllably setting the orientation between sample 10 and optical element 102. In particular, holding infrastructure 114 may be configured to allow orienting sample 10 and/or optical element 102, such that sample first surface 16a is adjacent and parallel to optical element second surface 134b (of optical element 102). According to some embodiments, holding infrastructure 114 may further be configured to orient sample 10, such that incident light beams, output by ICA 112, will perpendicularly impinge on optical element first surface 134a. As a non-limiting example, according to some embodiments, holding infrastructure 114 may include orienting infrastructure in the form of an orientable stage assembly 138 (e.g. a dual axis stage).

Stage assembly 138 is configured to allow mounting thereon a sample, such as sample 10, and adjusting the pitch angle and/or the roll angle of the sample (e.g. relative to ICA 112). According to some embodiments, stage assembly 138 may be configured to allow maneuvering a sample mounted thereon in each of six degrees of freedom. According to some embodiments, stage assembly 138 may include two goniometers (such as the goniometers depicted in FIG. 5; not shown in FIG. 1A): a pitch goniometer and a roll goniometer disposed one on top of the other. According to some such embodiments, stage assembly 138 may include an inclined platform (such as the inclined platform depicted in FIG. 5; not shown in FIG. 1A), which is configured (i) to be positioned on the top of one of the two goniometers and (ii) to have placed thereon sample 10. The inclination angle of the platform may be equal to, or about equal to, the nominal angle $\mu_{nom}$. In some such embodiments, optical element 102 may be positioned on sample 10 and supported thereby. Alternatively, according to some embodiments, holding infrastructure 114 may include orientable holding gear (not shown) configured to hold and controllably orient optical element 102. According to some embodiments, holding infrastructure 114 may be functionally associated with controller 108 and is configured to be controlled thereby.

Figure 1E:
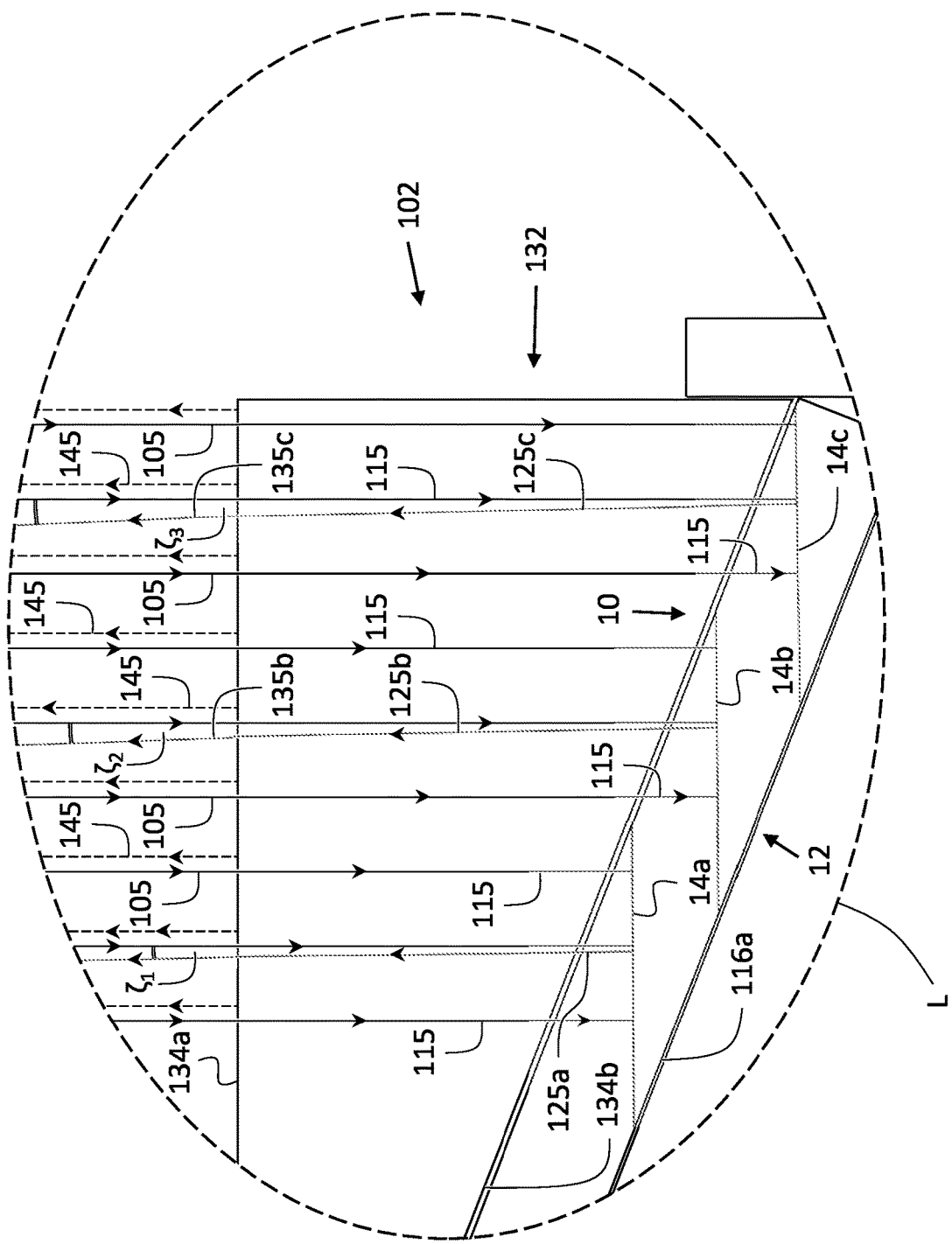
FIG. 1E is an enlarged view of a part of FIG. 1D.

Referring also to FIGS. 1D and 1E, FIG. 1D presents a cross-sectional side-view of system 100 and sample 10 with sample 10 undergoing inspection by system 100, according to some embodiments. FIG. 1E provides an enlarged view of a part of FIG. 1D delineated by a dashed line L. In operation, according to some embodiments, an expanded incident light beam, indicated by arrows 105 (not all of which are numbered), is projected on optical element first surface 134a. The incident light beam is collimated. In embodiments wherein the incident light beam is polychromatic, the incident light beam is projected normally to optical element first surface 134a, while in embodiments wherein the incident light beam is monochromatic, the incident light beam may be projected normally to optical element first surface 134a or at least about normally thereto (e.g. to within 1°, 1.5°, or even 2° from normal incidence).

The incident light beam (or at least a portion thereof) is transmitted into optical element 102 via (i.e. through) optical element first surface 134a, thereby obtaining a transmitted light beam. The transmitted light beam is indicated by arrows 115 (not all of which are numbered). The transmitted light beam travels across optical element 102, crosses (i.e. is transmitted) into sample 10 via optical element second surface 134b and sample first surface 16a, and propagates from sample first surface 16a towards internal facets 14. The transmitted light beam is reflected off internal facets 14 back towards sample first surface 16a.

More specifically, since internal facets 14 may slightly differ from one another in the respective orientations thereof, the transmitted light beam may be reflected at slightly different angles off each of internal facets 14, respectively. Accordingly, a plurality of reflected light beams may be obtained, which slightly differ in the respective propagation directions thereof. A first reflected light beam—corresponding to the portion of the transmitted light beam reflected off first internal facet 14a—is indicated by an arrow 125a. A second reflected light beam—corresponding to the portion of the transmitted light beam reflected off second internal facet 14b—is indicated by an arrow 125b. A third reflected light beam—corresponding to the portion of the transmitted light beam reflected off third internal facet 14c—is indicated by an arrow 125c.

The reflected light beams exit sample 10 into optical element 102 via sample first surface 16a and optical element second surface 134b. The reflected light beams travel from optical element second surface 134b to optical element first surface 134a and exit optical element 102, thereby obtaining a plurality of returned light beams: A first returned light beam—resulting from the refraction of the first transmitted light beam out of optical element 102—is indicated by an arrow 135a. A second returned light beam—resulting from the refraction of the second transmitted light beam out of optical element 102—is indicated by an arrow 135b. A third returned light beam—resulting from the refraction of the third transmitted light beam out of optical element 102—is indicated by an arrow 135c. The propagation direction of the i-th (i=1, 2, 3) returned light beam is tilted by a return angle $\zeta_i$ relative to the direction defined by the positive z-axis. For example, the propagation direction of the first returned light beam (indicated by arrow 135a) is tilted by the return angle $\zeta_1$ relative to the normal to first internal facet 14a. The returned light beams propagate towards ICA 112 and are focused by optical equipment 128 on light sensing component 124.

Light sensing component 124 is configured to allow obtaining from sensed data thereof angular deviations between pairs of returned light beams focused thereon. From the angular deviations, deviations from parallelism, or at least magnitudes of deviations from parallelism, between internal facets 14 may be inferred, for example, as described in the description of FIGS. 2A and 2B below.

According to some embodiments, wherein $\sigma=\mu_{nom}$, optical element first surface 134a may be coated by an anti-reflective coating, so that at most a negligible portion of the incident light beam is reflected off optical element first surface 134a.

According to some embodiments, wherein $\sigma=\mu_{nom}+\Delta$, e.g. with $0.3°\leq|\Delta|\leq0.5°$ or even $0.1°\leq|\Delta|\leq1°$ and optical element first surface 134a is not coated by anti-reflective coating, a portion of the incident light beam is reflected off optical element first surface 134a, as indicated by arrows 145. Arrows 145 are drawn as dashed in order to emphasize that the reflected portion (i.e. the portion of the incident light beam reflected off optical element first surface 134a) is present only in some embodiments, and, in particular, is not (or at least negligibly) present in embodiments wherein optical element first surface 134a is coated by anti-reflective coating. The value of A may be selected to ensure that the returned light beams (indicated by arrows 135a, 135b, and 135c) are distinguishable from the reflected portion (indicated by arrows 145). Thus, as depicted in FIG. 2B and detailed below, in embodiments wherein light sensing component 124 is an image sensor, while the spots formed by the returned light beams will typically cluster (i.e. be concentrated), the spot formed by the reflected portion of the incident light beam will fall markedly outside the cluster.

According to some embodiments, and as depicted in FIGS. 1A, 1D, and 1E optical element 102 may be positioned on (and, optionally, supported by) sample 10, such that optical element second surface 134b contacts all of sample first surface 16a, or at least all of output area 13. In such embodiments, the transmitted light beam passes directly from optical element 102 into sample 10, and the reflected light beams pass directly from sample 10 into optical element 102.

According to some embodiments, optical element second surface 134b does not contact sample first surface 16a. A space between optical element 102 and sample 10 (unless filled as described below and/or the incident light beam is sufficiently monochromatic) may lead to dispersion as the transmitted light beam exits optical element 102 via optical element second surface 134b. In embodiments wherein optical element second surface 134b and sample first surface 16a are parallel and sufficiently polished (and the refractive index of optical element 102 is equal to that of substrate 12), light beams of different frequencies will be realigned on entry into sample 10. Otherwise, in order to avoid or at least mitigate dispersion, according to some embodiments, light source 122 may be configured to produce a monochromatic light beam (e.g. a laser beam).

Additionally, or alternatively, according to some embodiments, not depicted the Figures, in order to avoid or mitigate dispersion, an index matching shape-compliant interface (not shown) may be inserted between sample 10 and optical element 102 (so as to be confined between sample first surface 16a and optical element second surface 134b). The shape-compliant interface may have about the same (e.g. to within ±0.02) refractive index as substrate 12 (and optical element 102). The shape-compliant interface may be a liquid, gel, or paste characterized by a surface tension and/or adhesive properties, such as to maintain integrity and disposition thereof when confined in a narrow space. According to some embodiments, the shape-compliant interface may be a malleable material. Thus, a light beam propagating through optical element 102, the shape-compliant interface, and sample 10 will substantially maintain the propagation direction thereof on passing from optical element 102 into the shape-compliant interface and on passing from the shape-compliant interface into sample 10.

Referring again to FIGS. 1B and 1C, it is appreciated that an attempt to directly inspect internal facets 14 without using a "mediating" (index matching) optical element, such optical element 102, may require projecting the incident light beams at a sufficiently large incidence angle on sample first surface 16a (i.e. at an air-sample interface, which will be formed when optical element 102 is not present) to ensure that light (or at least most of the light), reflected off one of internal facets 14 (e.g. second internal facet 14b), reemerges via sample first surface 16a without being reflected off another of the internal facets there above (e.g. first internal facet 14a). A large incidence angle, in turn, may lead to a weak signal (also because of dispersion) and a low signal-to-noise ratio.

The disclosed systems and methods advantageously address this problem by controlling the incidence angle (e.g. setting it equal to zero or close to zero) by use of an index matching optical element, such as optical element 102, on which the incident light beams are projected. The inclination angle of the optical element may be selected so that the transmitted light beams will close to perpendicularly impinge on the internal facets, ensuring that substantially all of the impinging light will be transmitted out of the sample without being reflected off any other of the internal facets.

Figure 2A:
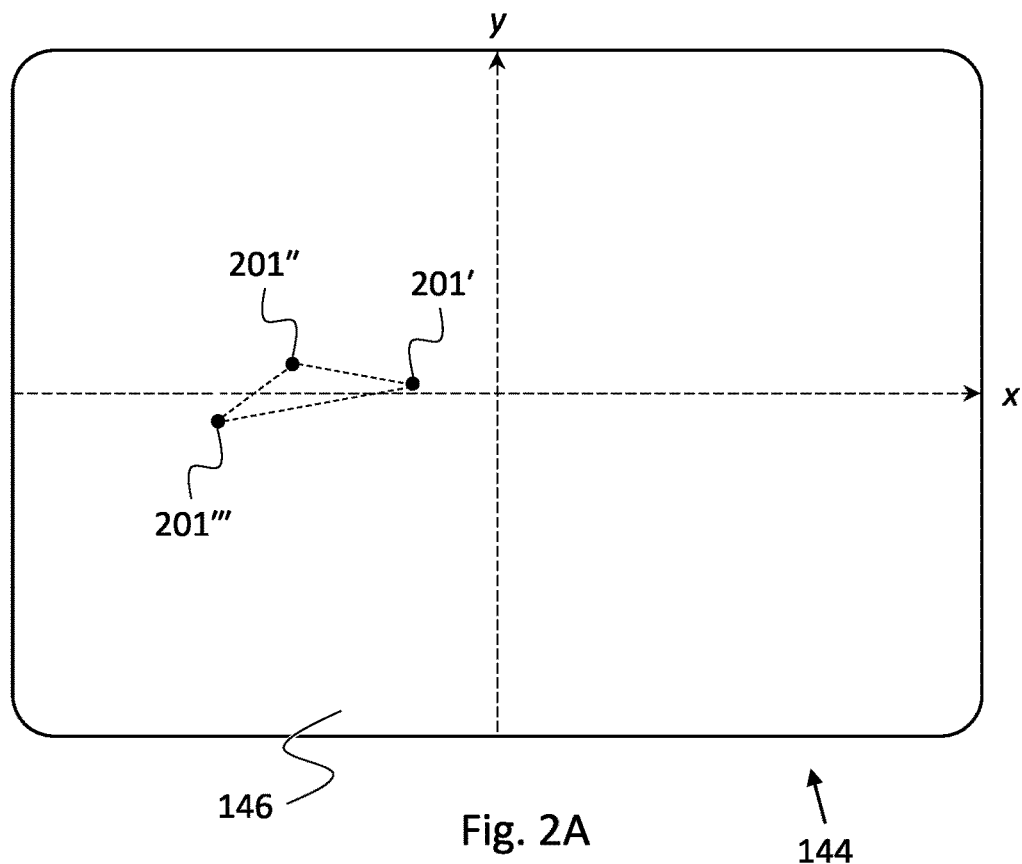
FIG. 2A schematically depicts spots on a photosensitive surface of an image sensor of the system of FIG. 1A, obtained as part of an inspection of a sample, according to some embodiments.
Figure 2B:
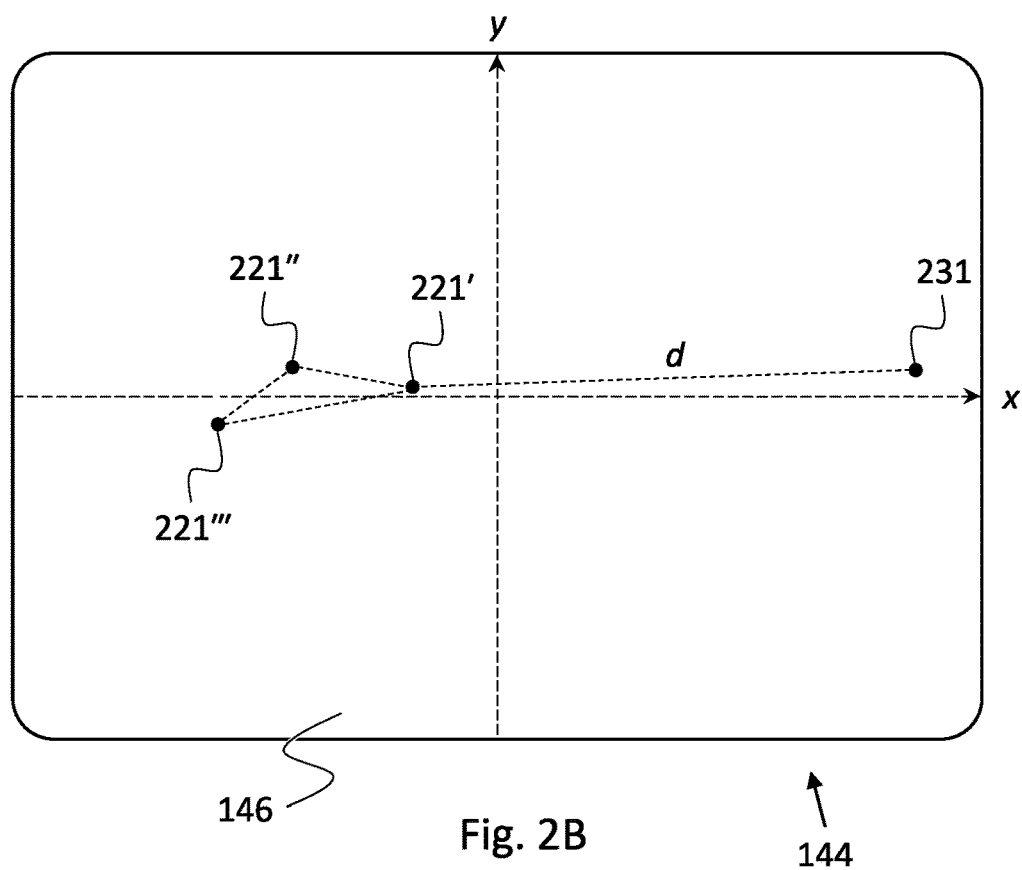
FIG. 2B schematically depicts spots on a photosensitive surface of an image sensor of the system of FIG. 1A, obtained as part of an inspection of a sample, according to some embodiments.

Referring also to FIG. 2A, FIG. 2A schematically depicts spots 201 on a photosensitive surface 244 of an image senor 224, according to some embodiments of system 100, wherein (i) $\sigma=\mu_{nom}$, (ii) optical element first surface 134a is coated by an anti-reflective coating, and (iii) ICA 112 includes an autocollimator including an image sensor (e.g. a digital or electronic collimator). The autocollimator includes image sensor 224, which corresponds to specific embodiments of light sensing component 124. Spots 201 include: a first spot 201', a second spot 201", and a third spot 201''', according to some embodiments. Spots 201 are formed by the returned light beams (indicated in FIGS. 1D and 1E by arrows 135). According to some embodiments, it may not be possible to attribute a spot to a specific returned light beam. (unless each of the internal facets is inspected separately, for example, as described below in the description of FIGS. 3 and 4, or, optionally, if additional information uniquely characterizing each of internal facets is available, for example, if the internal facets differ from one another by design in their reflectivity). In particular, it is to be understood that first spot 201' may be formed by the first returned light beam (induced by reflection off first internal facet 14a), the second returned light beam (induced by reflection off second internal facet 14b), or the third returned light beam (induced by reflection off third internal facet 14c). Similarly, second spot 201" may be formed by any one of the returned light beams (but a different returned light beam than that forming first spot 201'), and third spot 201''' may be formed by any one of the returned light beams (but a different returned light beam than each of that forming first spot 201' and that forming second spot 201"). However, as described by way of example below, information such an average magnitude of deviation (also referred to as the average "radial deviation") from parallelism and a maximum magnitude of deviation (also referred to as the maximum "radial deviation") from parallelism may be extracted from the coordinates of spots 201.

As used herein, the "radial deviation from parallelism" between internal facets generally refers to a quantifier deviation of deviation from parallelism, which takes into account both deviations in pitch and in roll.

The two-dimensional vectors $u_\alpha = (u_{\alpha,x}, u_{\alpha,y})$, $u_\beta = (u_{\beta,x}, u_{\beta,y})$, and $u_\gamma = (u_{\gamma,x}, u_{\gamma,y})$ specify the (measured) coordinates of first spot 201', second spot 201", and third spot 201''', respectively. More precisely, since each of spots 201 are spatially extended (i.e. not one-dimensional), the vectors $u_\alpha$, $u_\beta$, and $u_\gamma$ may specify center points of first spot 201', second spot 201", and third spot 201''', respectively. According to some embodiments, the center points may be computed by averaging over the coordinates of each pixel making up a spot weighted by the sensed (i.e. measured) intensity of the pixel.

The vector pa corresponds to the propagation direction of the returned light beam giving rise to first spot 201'. The vector pp corresponds to the propagation direction of the returned light beam giving rise to second spot 201". The vector $p_\gamma$ corresponds to the propagation direction of the returned light beam giving rise to third spot 201'''. The angular deviation $\delta_{\gamma\beta}$ corresponds to the magnitude of the angle subtended between $p_\gamma$ and $p_\beta$. The angular deviation $\delta_{\alpha\gamma}$ corresponds to the magnitude of the angle subtended between $p_\alpha$ and $p_\beta$. The angular deviation $\delta_{\beta\alpha}$ corresponds to the magnitude of the angle subtended between $p_\beta$ and $p_\alpha$. The angular deviations $\delta_{\gamma\beta}$, $\delta_{\alpha\gamma}$, and $\delta_{\beta\alpha}$ may be inferred from the vectors $u_\alpha$, $u_\beta$, and $u_\gamma$. In turn, from the angular deviations, a (magnitude of) deviation from parallelism between the internal facets may be inferred.

The coordinate system depicted in FIG. 2A is assumed to coincide with the coordinate system depicted in FIG. 1D up to a possible translation of the origin. According to some embodiments, wherein a focusing lens (not shown; e.g. of an autocollimator) of a focal length f is used to focus the returned light beams on an image sensor (e.g. of the autocollimator), the magnitudes of the angular deviations between the returned light beams may be computed using the relations $\tan(\delta_{\gamma\beta}) = \sqrt{(u_\beta - u_\gamma)^2}/f_1$, $\tan(\delta_{\alpha\gamma}) = \sqrt{(u_\gamma - u_\alpha)^2}/f_1$, and $\tan(\delta_{\beta\alpha}) = \sqrt{(u_\alpha - u_\beta)^2}/f_1$.

The unit vector $q_\alpha$ corresponds to the normal to the internal facet off which the light beam giving rise to first spot 201' is reflected. The unit vector $q_\beta$ corresponds to the normal to the internal facet off which the light beam giving rise to second spot 201" is reflected. The unit vector $q_\gamma$ corresponds to the normal to the internal facet off which the light beam giving rise to third spot 201''' is reflected. The deviation $\varepsilon_{\gamma\beta}$ corresponds to the magnitude of the angle subtended between $q_\gamma$ and $q_\beta$. The deviation $\varepsilon_{\alpha\gamma}$ corresponds to the magnitude of the angle subtended between $q_\alpha$ and $q_\gamma$. The deviation $\varepsilon_{\beta\alpha}$ corresponds to the magnitude of the angle subtended between $q_\beta$ and $q_\alpha$. As will be apparent to the skilled person (from Snell's law), $n_s \cdot \sin(2\varepsilon_\alpha) = \sin(\delta_\alpha)$, $n_s \cdot \sin(2\varepsilon_\beta) = \sin(\varepsilon_\beta)$, and $n_s \cdot \sin(2\varepsilon_\gamma) = \sin(\delta_\gamma)$.

The expression $\max\{\varepsilon_{\gamma\beta}, \varepsilon_{\alpha\gamma}, \varepsilon_{\beta\alpha}\}$ may be used to quantify the maximum radial deviation from parallelism. The expression $(\varepsilon_{\gamma\beta} + \varepsilon_{\alpha\gamma} + \varepsilon_{\beta\alpha})/3$ may be used to quantify the average radial deviation of the parallelism between the internal facets. Since none of spots 201 will typically be individually attributable to a reflection off a specific internal facet, the above expressions are independent of the signs of the angular deviations.

Similarly (with the depicted choice of coordinate system), the magnitudes of the deviations in pitch between the internal facets $\varepsilon_{\gamma\beta,p}$, $\varepsilon_{\alpha\gamma,p}$, $\varepsilon_{\beta\alpha,p}$ may be computed from the relations $\tan(\delta_{\gamma\beta,p}) = |u_{\beta,x} - u_{\gamma,x}|/f_1$ and $n_s \cdot \sin(2\varepsilon_{\gamma\beta,p}) = \sin(\delta_{\gamma\beta,p})$, $\tan(\delta_{\alpha\gamma,p}) = |u_{\gamma,x} - u_{\alpha,x}|/f_1$ and $n_s \cdot \sin(2\varepsilon_{\alpha\gamma,p}) = \sin(\delta_{\alpha\gamma,p})$, and $\tan(\delta_{\beta\alpha,p}) = |u_{\alpha,x} - u_{\beta,x}|/f_1$ and $n_s \cdot \sin(2\varepsilon_{\beta\alpha,p}) = \sin(\delta_{\beta\alpha,p})$, respectively. The magnitudes of the deviations in roll between the internal facets $\varepsilon_{\gamma\beta,r}$, $\varepsilon_{\alpha\gamma,r}$, $\varepsilon_{\beta\alpha,r}$ may be computed through the relations $\tan(\delta_{\gamma\beta,r}) = |u_{\beta,y} - u_{\gamma,y}|/f_1$ and $n_s \cdot \sin(2\varepsilon_{\gamma\beta,r}) = \sin(\delta_{\gamma\beta,r})$, $\tan(\delta_{\alpha\gamma,r}) = |u_{\gamma,y} - u_{\alpha,y}|/f_1$ and $n_s \cdot \sin(2\varepsilon_{\alpha\gamma,r}) = \sin(\delta_{\alpha\gamma,r})$, and $\tan(\delta_{\beta\alpha,r}) = |u_{\alpha,y} - u_{\beta,y}|/f_1$ and $n_s \cdot \sin(2\varepsilon_{\beta\alpha,r}) = \sin(\delta_{\beta\alpha,r})$, respectively. $\delta_{\gamma\beta,p}$ and $\delta_{\gamma\beta,r}$ correspond to the magnitudes of the pitch and roll, respectively, between $p_\gamma$ and $p_\beta$. $\delta_{\alpha\gamma,p}$ and $\delta_{\alpha\gamma,r}$ correspond to the magnitudes of the pitch and roll, respectively, between $p_\alpha$ and $p_\gamma$. $\delta_{\beta\alpha,p}$ and $\delta_{\beta\alpha,r}$ correspond to the magnitudes of the pitch and roll, respectively, between $p_\beta$ and $p_\alpha$. The expressions $\max\{\varepsilon_{\gamma\beta,p}, \varepsilon_{\alpha\gamma,p}, \varepsilon_{\beta\alpha,p}\}$ and $\max\{\varepsilon_{\gamma\beta,r}, \varepsilon_{\alpha\gamma,r}, \varepsilon_{\beta\alpha,r}\}$ may be used to quantify the maximum (magnitude of the) deviations in pitch and roll, respectively, between internal facets 14. The expressions $(\varepsilon_{\gamma\beta,p} + \varepsilon_{\alpha\gamma,p} - \varepsilon_{\beta\alpha,p})/3$ and $(\varepsilon_{\gamma\beta,r} + \varepsilon_{\alpha\gamma,r} + \varepsilon_{\beta\alpha,r})/3$ may be used to quantify the average (magnitude of) deviations in pitch and roll, respectively, between internal facets 14.

Alternatively, according to some embodiments, the maximum deviation from parallelism $\varepsilon_{max}$ between internal facets 14 may be quantified using the relations $$\tan(\delta_{max}) = \frac{1}{f}\sqrt{\sum_{k=x,y}(\max\{u_{\alpha,k}, u_{\beta,k}, u_{\gamma,k}\} - \min\{u_{\alpha,k}, u_{\beta,k}, u_{\gamma,k}\})^2}$$

and $n_s \cdot \sin(2\varepsilon_{max}) = \sin(\delta_{max})$.

According to some embodiments, wherein the deviations from parallelism are sufficiently small, small angle approximations may be employed. Under the small angle approximation (when working in radians) $\varepsilon_{\gamma\beta} = \sqrt{(u_\beta - u_\gamma)^2}/(2n_s f_1)$, $\varepsilon_{\alpha\gamma} = \sqrt{(u_\gamma - u_\alpha)^2}/(2n_s f_1)$, and $\varepsilon_{\beta\alpha} = \sqrt{(u_\alpha - u_\beta)^2}/(2n_s f_1)$. Similarly, $\varepsilon_{\gamma\beta,p} = |u_{\beta,x} - u_{\gamma,x}|/(2n_s f_1)$, $\varepsilon_{\alpha\gamma,p} = |u_{\gamma,x} - u_{\alpha,x}|/(2n_s f_1)$, and $\varepsilon_{\beta\alpha,p} = |u_{\alpha,x} - u_{\beta,p,x}|/(2n_s f_1)$, and $\varepsilon_{\gamma\beta,r} = |u_{\beta,y} - u_{\gamma,y}|/(2n_s f_1)$, $\varepsilon_{\alpha\gamma,r} = |u_{\gamma,y} - u_{\alpha,y}|/(2n_s f_1)$, and $\varepsilon_{\beta\alpha,r} = |u_{\alpha,y} - u_{\beta,y}|/(2n_s f_1)$.

Referring also to FIG. 2B, FIG. 2B schematically depicts spots 221 and a spot 231 on photosensitive surface 244, according to some embodiments of system 100, wherein $\sigma = \mu_{nom} + \Delta$ and optical element first surface 134a is not coated by an anti-reflective coating (and ICA 112 includes an autocollimator including an image sensor). Spot 231 is formed by the portion (indicated in FIGS. 1C and 1D by arrows 145) of the incident light beam reflected off optical element first surface 134a.

Spots 221 include a first spot 221', a second spot 221", and a third spot 221'". The two-dimensional vectors $u'=(u'_x, u'_y)$, $u''=(u''_x, u''_y)$, and $u'''=(u'''_x, u'''_y)$ specify coordinates (e.g. center points) of first spot 221', second spot 221", and third spot 221'", respectively. The two-dimensional vector $v=(v_x, v_y)$ specifies the coordinates of spot 231. First spot 221' is the closest of spots 221 to spot 231. d denotes the distance between first spot 221' and spot 231 (i.e. $d=\|u'-v\|=\sqrt{(u'-v)^2}$). According to some embodiments, the optical element inclination angle σ (or more precisely the magnitude of Δ) is selected to ensure that d will be much greater than each of $\|u'-v\|$, $\|u''-v\|$, and $\|u'''-v\|$, and thereby ensure identification of spot 231 (i.e. the attribution of spot 231 to the portion of the incident light beam reflected off optical element first surface 134a).

Computational module 146 may include one or more processors and volatile and/or non-volatile memory components. The one or more processors may be configured to compute a collective (e.g. maximum or average) deviation from parallelism, and/or deviations from parallelism between one or more pairs of internal facets, based on raw or processed sensed data (i.e. measurement data) from light sensing component 124. Raw sensed data may include intensities of pixels making up spots formed by returned light beams focused on the light sensing component 124. Processed sensed data of light sensing component 124 may include the angular deviations between (pairs of) the returned light beams or the center points of the spots formed by the returned light beams (e.g. the coordinates of the vectors $u_\alpha$, $u_\beta$, and $u_\gamma$ or the vectors u', u", and u'"). According to some such embodiments, computational module 146 may be configured to process raw sensed data of light sensing component 124 to obtain therefrom the angular deviations between (pairs of) the returned light beams.

According to some embodiments, the one or more processors may include a graphics processing unit (GPU) configured to execute image recognition software in order to identify spots 201. According to some embodiments, wherein optical element first surface 134a is not coated by a reflective coating, the image recognition software may further be configured to distinguish spot 231 from spots 221. According to some embodiments, the one or more processors may be additionally configured to assign coordinates to each spot (i.e. compute the center point of each spot).

According to some embodiments, and as depicted in the Figures, computational module 146 may be communicatively associated with controller 108, and light sensing component 124 sensed data (i.e. measurement data) may be relayed to computational module 146 via controller 108. Alternatively, according to some embodiments, light sensing component 124 may be configured to directly send the sensed data to computational module 146. According to some embodiments, computational module 146 may be included in system 100.

Figure 3:
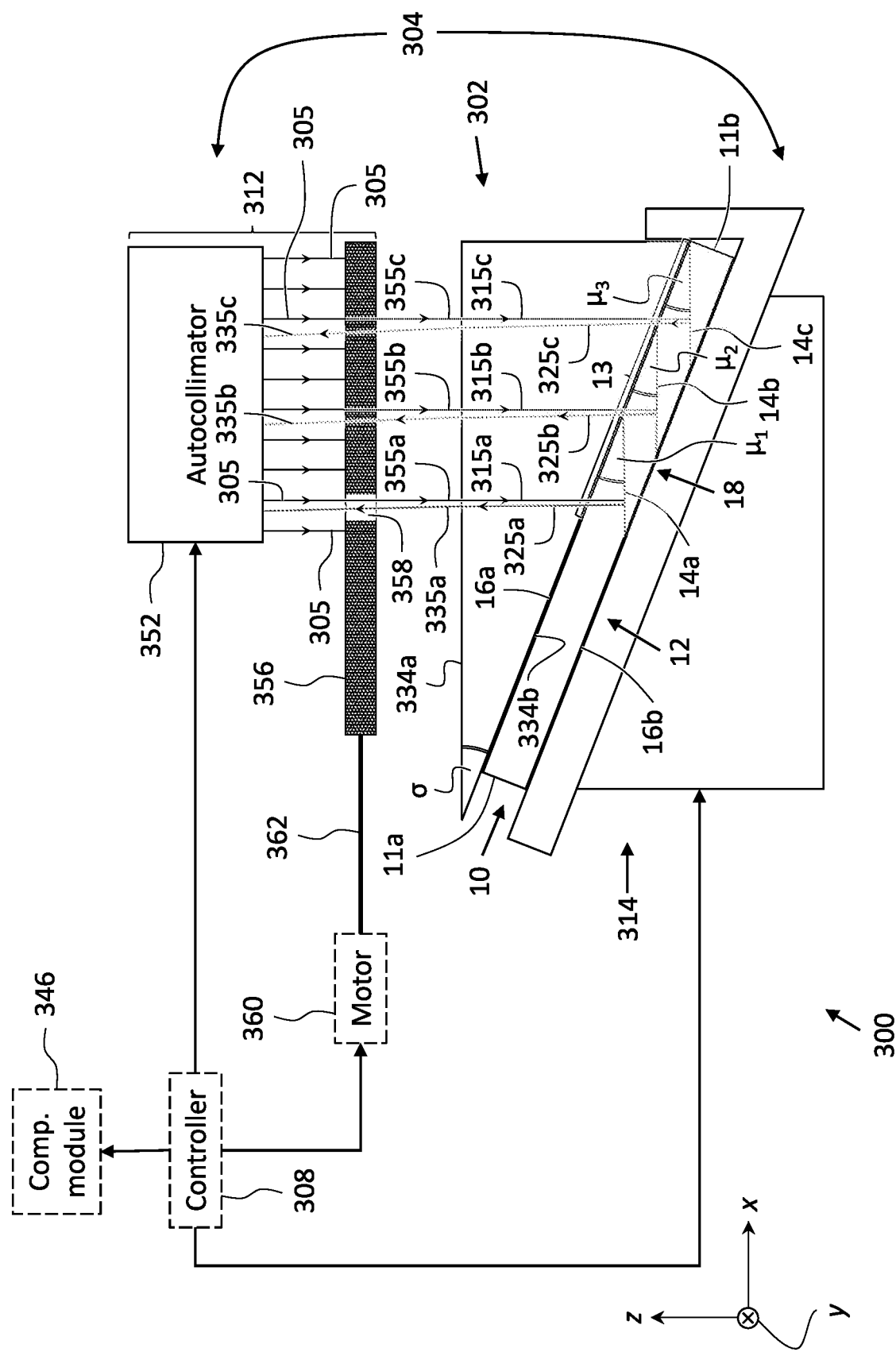
FIG. 3 schematically depicts an optical-based system for metrology of internal facets of samples, which corresponds to specific embodiments of the system of FIG. 1A.

FIG. 3 schematically depicts such a system, an optical-based system 300 for validating parallelism between internal facets of a sample, according to some embodiments. More specifically, FIG. 3 presents a cross-sectional sideview of system 300 and sample 10, according to some embodiments. (It is to be understood that sample 10 does not constitute a part of system 300.) δystem 300 corresponds to specific embodiments of system 100.

δystem 300 includes a light transmissive optical element 302, an optical setup 304, and, optionally, a controller 308, which correspond to specific embodiments of optical element 102, optical setup 104, and controller 108, respectively. Optical element 302 includes a substrate 332, an optical element first surface 334a, and an optical element second surface 334b, which correspond to specific embodiments of substrate 132, optical element first surface 134a, and optical element second surface 134b, respectively.

Optical setup 304 includes an ICA 312 and an orientable holding infrastructure 314, which correspond to specific embodiments of ICA 112 and holding infrastructure 114, respectively. ICA 312 includes an autocollimator 352 including an image sensor (not shown). According to some embodiments, autocollimator 352 is a digital autocollimator or an electronic autocollimator. According to some embodiments, autocollimator 352 is a laser autocollimator. According to some embodiments, ICA 312 may further include an optical mask 356 including a slit (elongated hole) 358. According to some embodiments, optical mask 356 may be translatable, so as to allow controllably positioning slit 358 above any of internal facets 14, and thereby allow inspecting each of internal facets 14 one at a time. According to some such embodiments, optical setup 304 may further include a motor 360, which may be mechanically associated with optical mask 356, so as to allow translating optical mask 356. According to some embodiments, motor 360 may be a linear stepper motor, which may be mechanically coupled to optical mask 356 via a screw 362.

Also indicated is a computational module 346, which corresponds to specific embodiments of computational module 146. According to some embodiments, computational module 346 may be included in system 300.

According to some alternative embodiments, not depicted in FIG. 3, instead of optical mask 356 (and motor 360), ICA 312 may include a shutter assembly, including a plurality of individually openable and closeable shutters. Each shutter may be positioned above a respective internal facet, thereby allow inspecting each of internal facets 14 one at a time.

In operation, according to some embodiments, optical mask 356 may be laterally translated, so as to position slit 358 above each of internal facets 14 one after the other. A collimated light beam, indicated by arrows 305, is projected on optical mask 356 in a direction perpendicular to optical element first surface 334a. When slit 358 is positioned above first internal facet 14a, a(first) incident portion of the collimated light beam passes through slit 358, normally impinges on optical element first surface 334a, and is transmitted therethrough into optical element 302, thereby obtaining a transmitted light beam. The first incident portion is indicated by an arrow 355a and the transmitted light beam is indicated by an arrow 315a. The transmitted light beam travels across optical element 302, crosses (i.e. is transmitted into) into sample 10 via optical element second surface 334b and sample first surface 16a, and propagates from sample first surface 16a towards first internal facet 14a. The transmitted light beam is reflected off first internal facet 14a back towards sample first surface 16a.

A first reflected light beam—corresponding to the portion of the transmitted light beam reflected off first internal facet 14a—is indicated by an arrow 325a. The first reflected light beam exits sample 10 and is transmitted into optical element 302 via sample first surface 16a and optical element second surface 334b. The first reflected light beam travels from optical element second surface 334b to optical element first surface 334a and exits (e.g. is refracted out of) optical element 302, thereby obtaining a first returned light beam.

The first returned light beam is indicated by an arrow 335a. The first returned light beam travels to autocollimator 352, after passing through slit 358, and is sensed by the image sensor of autocollimator 352.

A trajectory of a second incident portion, a second transmitted light beam, a second reflected light beam, and a second returned light beam is indicated by dotted arrows 355b, 315b, 325b, and 335b, respectively. This trajectory will be realized when optical mask 356 is translated such that slit 358 is positioned over second internal facet 14b. Arrows 355b, 315b, 325b, and 335b are rendered by a dotted line to indicate this trajectory is not realized when slit 358 is positioned over first internal facet 14a (i.e. the corresponding light beams are not present when slit 358 is positioned over first internal facet 14a). A trajectory of a third incident portion, a third transmitted light beam, a third reflected light beam, and a third returned light beam is indicated by dotted arrows 355c, 315c, 325c, and 335c, respectively. This trajectory will be realized when optical mask 356 is translated such that slit 358 is positioned over third internal facet 14c. Arrows 355c, 315c, 325c, and 335c are rendered by a dotted line to indicate this trajectory is not realized when slit 358 is positioned over first internal facet 14a (i.e. the corresponding light beams are not present when slit 358 is positioned over first internal facet 14a).

According to some embodiments, optical mask 356 may be translated continuously. As a transmitted light is scanned along an internal facet, the respective spot formed on the image sensor of autocollimator 352 remains essentially fixed (unless the internal facet is bent, curved, and/or otherwise deformed). As the transmitted light beam transitions onto an adjacent internal facet, a new spot is formed on the image sensor (when the two internal facets are sufficiently misaligned). Once the transition is completed, only the new spot remains on the image sensor.

According to some alternative embodiments, optical mask 356 may be shifted between distinct locations in a plurality of locations. In each of the locations slit 358 is positioned above a respective one of internal facets 14. Optionally, according to some embodiments, the collimated light beam 305 is projected only when optical mask 356 is in one of the (distinct) locations.

Figure 4:
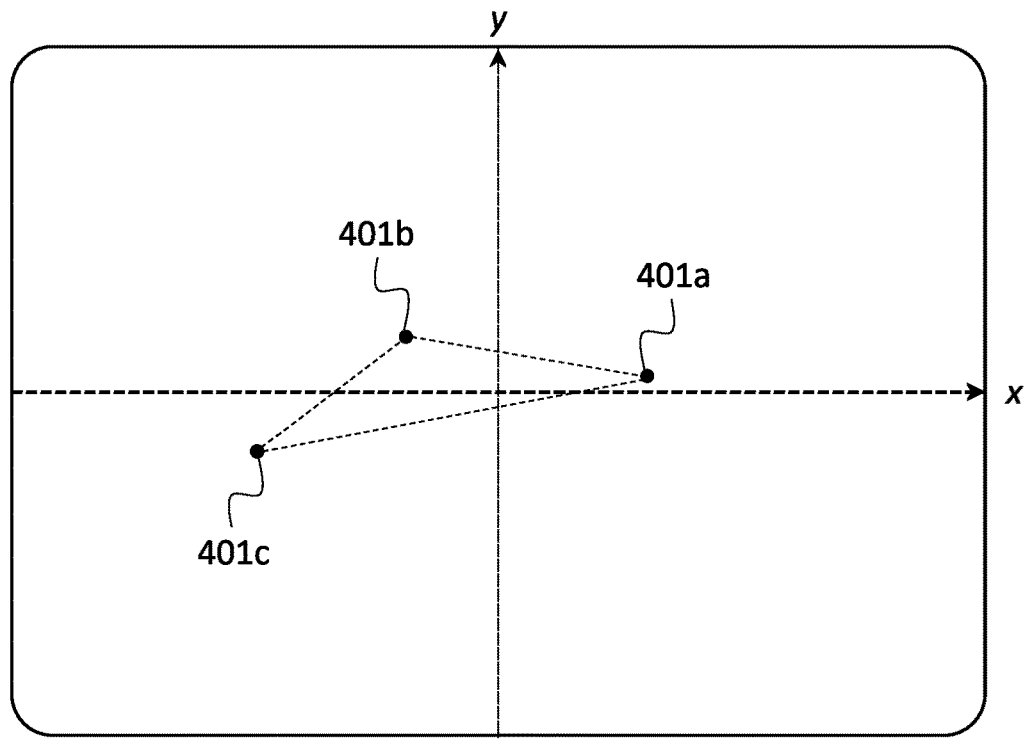
FIG. 4 schematically depicts spots on a digital display associated with an autocollimator of the system of FIG. 3, obtained as part of an inspection of a sample, according to some embodiments.

Referring also to FIG. 4, FIG. 4 schematically depicts spots 401 on a digital display 464 associated with autocollimator 352, according to some embodiments of system 100, wherein $\sigma = \sigma_{nom}$ and optical element first surface 334a is coated by an anti-reflective coating. Spots 401 include: a first spot 401a, a second spot 401b, and a third spot 401c, according to some embodiments. Since internal facets 14 are inspected one at a time, it is known which of the returned light beams gave rise to each of spots 401. Therefore, the deviation from parallelism between each pair of internal facets 14 may be computed, as explained below. First spot 401a is formed by the first returned light beam (indicated in FIG. 3 by arrow 335a). Second spot 401b is formed by the second returned light beam (indicated in FIG. 3 by arrow 335b). Third spot 401c is formed by the third returned light beam (indicated in FIG. 3 by arrow 335c).

The two-dimensional vectors $u_1 = (u_{1,x}, u_{1,y})$, $u_2 = (u_{2,x}, u_{2,y})$, and $u_3 = (u_{3,x}, u_{3,y})$ specify the coordinates (e.g. center points) of first spot 401a, second spot 401b, and third spot 401c, respectively. Deviations in pitch, as well as in roll, between each of pair of internal facets 14 may be computed from $u_1$, $u_2$, and $u_3$.

According to some embodiments, wherein a focusing lens (not shown; e.g. of an autocollimator) of a focal length $f_2$ is used to focus the returned light beams on an image sensor (e.g. of the autocollimator), with a suitable choice of coordinate system, deviations in pitch $\delta_{21,p}$ and in roll $\delta_{21,r}$ of the second returned light beam relative to the first returned light beam may be computed via $\tan(\delta_{21,p}) = (u_{2,x} - u_{1,x})/f_2$ and $\tan(\delta_{21,r}) = (u_{2,y} - u_{1,y})/f_2$, respectively. Similarly, deviations in pitch $\delta_{31,p}$ and in roll $\delta_{31,r}$ of the third returned light beam relative to the first returned light beam may be computed via $\tan(\delta_{31,p}) = (u_{3,x} - u_{1,x})/f_2$ and $\tan(\delta_{31,r}) = (u_{3,y} - u_{1,y})/f_2$, respectively, and deviations in pitch $\delta_{32,p}$ and in roll $\delta_{32,r}$ of the third returned beam relative to the second returned beam may be computed via $\tan(\delta_{32,p}) = (u_{3,x} - u_{2,x})/f_2$ and $\tan(\delta_{32,r}) = (u_{3,y} - u_{2,y})/f_2$, respectively. Accordingly, the deviations in pitch $\varepsilon_{21,p}$ and in roll $\varepsilon_{21,r}$ of second internal facet 14b relative to first internal facet 14a may be computed using the relations $n_s \cdot \sin(2\varepsilon_{21,p}) = \sin(\delta_{21,p})$ and $n_s \cdot \sin(2\varepsilon_{21,r}) = \sin(\delta_{21,r})$, respectively. The deviations in pitch $\varepsilon_{31,p}$ and in roll $\varepsilon_{31,r}$ of third internal facet 14c relative to first internal facet 14a may be computed using $n_s \cdot \sin(\varepsilon_{31,p}) = \sin(\delta_{31,p})$ and $n_s \cdot \sin(2\varepsilon_{31,r}) = \sin(\varepsilon_{31,r})$, respectively. The deviations in pitch $\varepsilon_{32,p}$ and in roll $\varepsilon_{32,r}$ of third internal facet 14c relative to second internal facet 14b may be computed using $n_s \cdot \sin(2\varepsilon_{32,p}) = \sin(\varepsilon_{32,p})$ and $n_s \cdot \sin(2\varepsilon_{32,r}) = \sin(\delta_{32,r})$, respectively.

The magnitudes of the deviations (i.e. the radial deviations) from parallelism of second internal facet 14b relative to first internal facet 14a, third internal facet 14c relative to first internal facet 14a, and third internal facet 14c relative to second internal facet 14b can be computed using the relations $\tan(\delta_{21}) = \sqrt{(u_2 - u_1)^2}/f_2$ and $n_s \cdot \sin(2\varepsilon_{21}) = \sin(\delta_{21})$, $\tan(\delta_{31}) = \sqrt{(u_3 - u_1)^2}/f_2$ and $n_s \cdot \sin(2\varepsilon_{31}) = \sin(\delta_{31})$, and $\tan(\delta_{32}) = \sqrt{(u_3 - u_2)^2}/f_2$ and $n_s \cdot \sin(2\varepsilon_{32}) = \sin(\delta_{32})$, respectively.

According to some embodiments, wherein the deviations from parallelism are sufficiently small, small angle approximations may be employed. As will be apparent to the skilled person, under the small angle approximation (when working in radians) $\varepsilon_{21,p} = (u_{2,x} - u_{1,x})/(2n_s \cdot f_2)$ and $\varepsilon_{21,r} = (u_{2,y} - u_{1,y})/(2n_s \cdot f_2)$, $\varepsilon_{31,p} = (u_{3,x} - u_{1,x})/(2n_s \cdot f_2)$ and $\varepsilon_{31,r} = (u_{3,y} - u_{1,y})/(2n_s \cdot f_2)$, and $\varepsilon_{32,p} = (u_{3,x} - u_{2,x})/(2n_s \cdot f_2)$ and $\varepsilon_{32,r} = (u_{3,y} - u_{2,y})/(2n_s \cdot f_2)$.

According to some embodiments, computational module 346 may be configured to compute deviations from parallelism between some or all pairs of internal facets in an inspected sample. According to some embodiments, particularly embodiments wherein the number of internal facets is large, computational module 346 may be configured to compute the deviations from parallelism between all pairs of adjacent internal facets in an inspected sample. According to some such embodiments, computational module 346 may be configured to compute deviations from parallelism between one of the internal facets (e.g. a sidemost internal facet) and each of all the other internal facets. According to some embodiments, computational module 346 may be further configured to additionally compute the uncertainties in the computed deviations from parallelism.

According to some alternative embodiments, not depicted in the Figures, instead of optical setup 304, system 300 may include an interferometric setup, and information, including radial deviations from parallelism between pairs of internal facets 34, may be extracted from interference patterns formed by the returned light beams. According to some such embodiments, the interferometric setup may include an array of beam splitters and an associated array of controllably openable and closeable light blocking filters configured to allow inspecting pairs of internal facets one at time. More specifically, the beam splitters and light blocking filters arrays may be configured (i) split an incident beam into a selectable pair of incident sub-beams normally incident on optical element 302, and (ii) recombine two returned sub-beams—induced by the pair of incident light beams, respectively—into a single combined returned light beam, which is then sensed by a light sensor. The beam splitters and blocking filters arrays is configured such that each selectable pair of incident sub-beams will induce reflection off a respective pair of internal facet, such that a first incident sub-beam probes one of the internal facets and the second incident sub-beam probes another internal facet. For example, a first incident sub-beam will induce reflection off an i-th internal facet (following transmission into optical element 302, passage therethrough, and transmission into sample 10), and a second incident sub-beam will induce reflection off a j-th internal facet (following transmission into optical element 102, passage therethrough, and transmission into sample 10), wherein i and j are controllably selectable. As the skilled person will readily recognize, the radial deviation from parallelism of between the i-th and j-th internal facet may be extracted from the interference pattern formed thereby on the light sensor.

Figure 5:
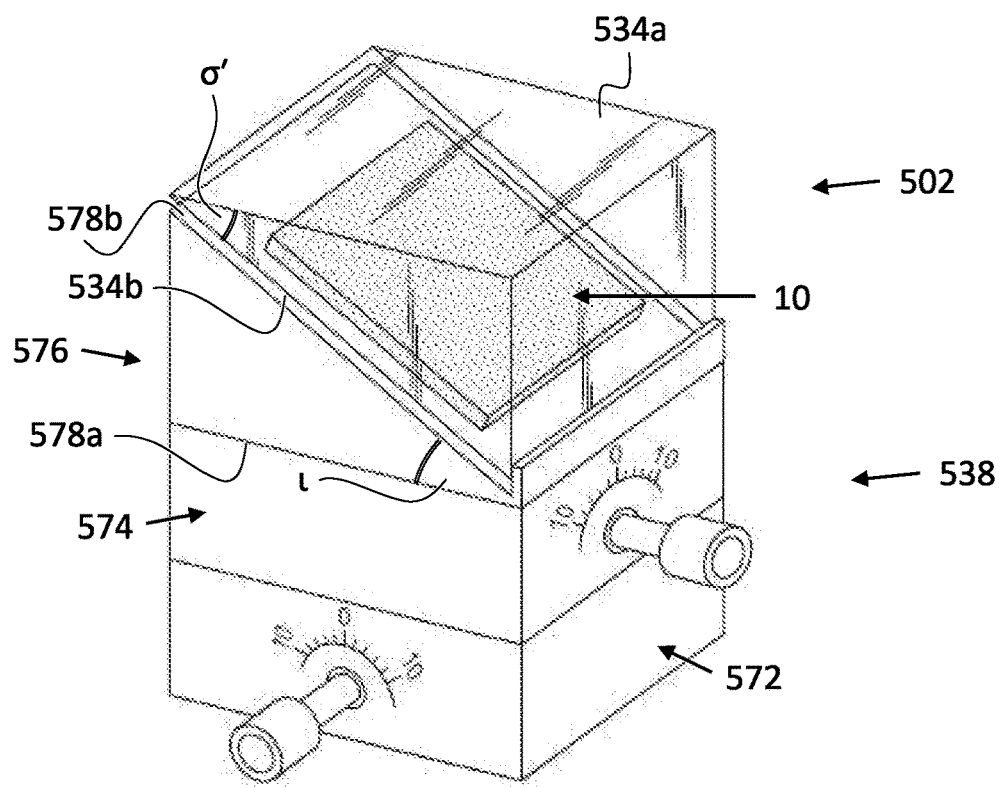
FIG. 5 schematically depicts some components of an optical-based system for metrology of internal facets of samples, which correspond to specific embodiments of the system of FIG. 1A, and a sample, which is to be inspected using the system.

FIG. 5 schematically depicts a stage assembly 538 with sample 10 disposed thereon, according to some embodiments. Also depicted is an optical element 502, which is disposed on sample 10. Stage assembly 538 and optical element 502 correspond to specific embodiments of stage assembly 138 and optical element 102 of system 100. Stage assembly 538 includes a pitch goniometer 572, a roll goniometer 574, and an inclined platform 576. According to some embodiments, and as depicted in FIG. 5, inclined platform 576 is mounted on roll goniometer 574, which is mounted on pitch goniometer 572. Inclined platform 576 includes an external and flat top surface 578a and an external and flat base surface 578b opposite to top surface 578a. According to some embodiments, top surface 578a may be inclined relative to base surface 578b at a platform inclination angle ɩ, which may be about equal to the nominal angle $\mu_{nom}$.

The orientation of optical element 502 may be adjusted by orienting pitch goniometer 572 and roll goniometer 574, thereby allowing to controllably set the incidence angle of a light beam projected on optical element 502, e.g. by an ICA (not shown). According to some embodiments, each of pitch goniometer 572 and roll goniometer 574 may be oriented using a programable micrometer (not shown). Additionally, or alternatively, according to some embodiments, each of pitch goniometer 572 and roll goniometer 574 may be manually orientable.

Also indicated is an inclination angle σ' of optical element 502, which may be about equal to the nominal angle $\mu_{nom}$.

Methods

According to an aspect of some embodiments, there is provided an optical-based method for metrology of internal facets of samples. The method may be employed to validate parallelism between internal facets of a sample. FIG. 6 presents a flowchart of such a method, an optical-based method 600, according to some embodiments. Method 600 may include:

A stage 610, wherein a sample (e.g. sample 10), which is to be inspected, is provided. The sample includes a light transmissive substrate, which has a refractive index $n_s$, and two or more nominally parallel internal facets (e.g. internal facets 14). Each of the internal facets is nominally inclined relative to an external and flat surface of the sample at an angle $\mu_{nom}$ (e.g. the nominal angle $\mu_{nom}$).

A stage 620, wherein an optical element (e.g. optical element 102 or optical element 302), which has a refractive index about equal (e.g. greater than $n_s$−0.02 and smaller than $n_s$+0.02) to $n_s$, is provided. The optical element includes an external and flat first surface and an external and flat second surface, which is opposite to the first surface of the optical element and inclined relative thereto at an angle σ, which is about equal to the nominal angle $\mu_{nom}$.

A stage 630, wherein the sample and the optical element are positioned such that the second surface of the optical element is parallel and adjacent to the surface of the substrate.

A stage 640, wherein a plurality of incident light beams is projected on the first surface of the optical element, about normally thereto (e.g. to within 1°, 1.5°, or even 2° from normal incidence).

A stage 650, wherein a plurality of returned light beams is obtained following passage of the incident light beams through the optical element, transmission thereof into the sample and reflection off the internal facets, repassage through the optical element, and exit out of (e.g. refraction out of) the optical element via the first surface of the optical element.

A stage 660, wherein the plurality of returned light beams are sensed (measured, e.g. using light sensing component 124).

A stage 670, wherein, based on the sensed data (measured data), at least one deviation from parallelism between at least some of the internal facets is computed.

As used herein, the term "obtaining" may be employed both in an active and a passive sense. Thus, for example, in stage 650 the returned light beams may be obtained, not as a result of any operation implemented in stage 650, but rather due to the generation of the incident light beams in stage 640. Generally, a stage may describe an active operation performed by a user or by the system used to implement the method, and/or the results or effects of one or more operations performed in one or more earlier stages.

Method 600 may be employed to validate parallelism of internal facets of a sample, such as sample 10 (including any of the embodiments of sample 10 described above). In particular, method 600 may be employed to validate parallelism of internal facets of one-dimensional reflective waveguides, as well as two-dimensional reflective waveguides.

Method 600 may be implemented employing an optical-based system, such as any one of systems 100 and 300 or systems similar thereto, as detailed above in the respective descriptions thereof. According to some the optical element may be prism.

According to some embodiments, σ=$\mu_{nom}$. According to some such embodiments, to eliminate having to distinguish between the returned light beams and light reflected directly off the first surface of the optical element, the first surface of the optical element may be coated by an anti-reflective coating. Alternatively, according to some embodiments, σ=$\mu_{nom}$+Δ. According to some such embodiments, the first surface of the optical element is not coated by an anti-reflective coating and |Δ| is sufficiently large to ensure that the returned light beams are distinguishable from light reflected directly off the first surface of the optical element, as explained above in the description of FIG. 2B. According to some embodiments, 0.3°≤|Δ|≤0.5°, 0.2°≤|Δ|≤0.7°, or even 0.1°≤|Δ|≤1°. Each possibility corresponds to separate embodiments. The upper bound on the magnitude of Δ may be selected to ensure that the spots formed on the image sensor are unblurred.

According to some embodiments, particularly embodiments wherein (i) the surface of the sample and/or the first surface of the optical element are not sufficiently polished and/or cannot be aligned to sufficient precision, and (ii) the light source employed is polychromatic or not sufficiently monochromatic, in order to eliminate or at least mitigate dispersion a shape compliant interface, having about the same (e.g. greater than $n_s-0.02$ and smaller than $n_s+0.02$) refractive index as the substrate (making up the bulk of the sample), a shape-compliant interface may be positioned between the optical element and the sample, as described above in the description of system 100.

According to some embodiments, in stage 640, the incident light beams may constitute complementary portions of an expanded light beam, which is collimated. According to some embodiments, the incident light beams may constitute complementary portions of an expanded laser beam.

According to some embodiments, the internal facets are inspected (i.e. probed) one at a time. More specifically, according to some embodiments, stages 640, 650, and 660 may be implemented N times, wherein N is the number of internal facets, and wherein in each implementation light is impinged on only one of the internal facets, as described above in the description of system 300 and some embodiments of system 100. The individual inspection of the internal facets may be performed using system 300 or a system similar thereto.

According to some embodiments, an autocollimator is employed to implement stages 640, 650, and 660, e.g. essentially as described above in the description of system 100 and the various embodiments thereof (including system 300). According to some embodiments, the autocollimator includes an image sensor. In some such embodiments, in stage 660, the returned light beams may be sensed using the image sensor of the autocollimator. Alternatively, according to some embodiments, the autocollimator is a visual autocollimator and the returned light beams are sensed using an eyepiece assembly of the autocollimator (by viewing a graduated reticle through the eyepiece).

According to some embodiments, wherein an image sensor is employed to sense the returned light beams, stage 670 may include an initial substage wherein image recognition software is used to identify spots (e.g. spots 201, spots 221, or spots 401) formed by each of the returned light beams on a photosensitive surface of the image sensor. According to some embodiments, the initial substage may further include assigning coordinates to each of the spots, e.g. determining the center points of the spots. According to some embodiments, the center points may be determined by averaging over the coordinates of each pixel making up a spot weighted by the sensed (i.e. measured) intensity of the pixel. According to some embodiments, wherein the first surface of the optical element is not coated by a reflective coating, so that an additional spot (e.g. spot 231) may be formed on the photosensitive surface of the image sensor (i.e. by light reflected directly off the optical element first surface), the image recognition software may further be configured to distinguish the additional spot from the spots formed by the returned light beams.

According to some embodiments, wherein the internal facets are inspected one at a time, in stage 670, deviations from parallelism between pairs of adjacent internal facets are computed. Additionally, or alternatively, according to some embodiments, deviations from parallelism between one of the internal facets (e.g. a sidemost internal facet) and each of the other internal facets are computed. According to some embodiments, deviations from parallelism between each pair of internal facets are computed. According to some embodiments, based on the computed deviations, one or more average and/or maximum deviations from parallelism (e.g. between adjacent internal facets and/or between a sidemost internal facet and each of the other internal facets) are computed. According to some embodiments, average and/or maximum deviations in pitch and/or average and/or maximum deviations in roll may be computed.

According to some embodiments, the deviation in pitch $\varepsilon_{ij,\,p}$ between an i-th internal facet and a j-th internal facet may be computed using the relations $\tan(\delta_{ij,\,p})=(x_i-x_j)/f$ and $n_s \cdot \sin(2\varepsilon_{ij,\,p})=\sin(\delta_{ij,\,p})$. $x_i$ and $x_j$ are the determined x coordinates (e.g. the horizontal coordinates of center points of spots on an image sensor) of the i-th returned light beam and the j-th returned light beam, respectively (with the implicit assumption that the coordinate system is such that an x coordinate of a spot is determined by the pitch of the respective internal facet). Similarly the deviation in roll $\varepsilon_{ij,\,r}$ between the i-th internal facet and the j-th internal facet may be computed via $\tan(\delta_{ij,\,r})=(y_i-y_j)/f$ and $n_s \cdot \sin(2\varepsilon_{ij,\,r})=\sin(\delta_{ij,\,r})$. $y_i$ and $y_j$ are the determined y coordinates (e.g. the vertical coordinates of center points of the spots on the image sensor) of the i-th returned light beam and the j-th returned light beam, respectively (with the implicit assumption that the coordinate system is such that a y coordinate of a spot is determined by the roll of the respective internal facet).

The magnitude of the deviation from parallelism $\varepsilon_{ij}$ of the i-th internal facet relative to the j-th internal facet can be computed using the relations $\tan(\delta_{ij})=\sqrt{(x_i-x_j)^2+(y_i-y_j)^2}/f$ and $n_s \cdot \sin(2\varepsilon_{ij})=\sin(\delta_{ij})$.

According to some embodiments, wherein the deviations from parallelism are sufficiently small, small angle approximations may be employed. As will be apparent to the skilled person, under the small angle approximation (when working in radians) $\varepsilon_{ij,\,p}=(x_i-x_j)/(2n_s \cdot f)$ and $\varepsilon_{ij,\,r}=(y_i-y_j)/(2n_s \cdot f)$.

According to some embodiments, wherein the first surface of the optical element is not coated by an anti-reflective coating and $\sigma=\mu_{nom}+\Delta$, deviations $\varepsilon_{i,\,p}'$ in pitch and in $\varepsilon_{i,\,r}'$ roll of each of the internal facets from the nominal orientation may be computed using the relations $\tan(\delta_{i,\,p}')=(x''-x_i')/f$ and $n_s \sin(2\varepsilon'_{i,\,p})=\sin(\delta'_{i,\,p})$, and $\tan(\delta_{i,\,r}')=(y''-y_i')/f$ and $n_s \cdot \sin(2\varepsilon'_{i,\,r})=\sin(\delta_{i,\,r}')$. For each i, $x_i'$ and $y_i'$ are the determined x coordinates and y coordinates of the spot induced by the light beam, which may traced back to reflection off the i-th internal facet. x" and y" are the determined x and y coordinates of the spot formed by light beams directly reflected off the first surface of the optical element.

According to some embodiments, the determination of the coordinates of the spots may be include computing associated uncertainties, and, based thereon, uncertainties in the deviations from parallelism between pairs of internal facets.

According to some embodiments, wherein the internal facets are not inspected one at a time (e.g. all the internal facets are simultaneously inspected), so that the each of spots (formed by the returned light beams) is typically not attributable to one of the internal facets (at least not without additional data), in stage 670, an average radial deviation (i.e. average magnitude of deviation) from parallelism and/or a maximum radial deviation (i.e. magnitude of deviation) from parallelism are computed. More specifically, according to some embodiments, an average radial deviation from parallelism may be obtained by using the relations $\tan(\delta_{lm})=(x_l'''-x_m''')^2+(y_l'''-y_m''')^2/f$ and $n_s \cdot \sin(2\varepsilon_{ij})=\sin(\varepsilon_{ij})$ to compute $$\frac{1}{M}\sum_{l,m>l}\varepsilon_{lm}.$$

Here $\delta_{lm}$ is the magnitude of the angular deviation between the light beam inducing the l-th spot and the light beam inducing the m-th spot. $\varepsilon_{lm}$ is the magnitude of the deviation between the internal facet, off which the light beam inducing the l-th spot is reflected, and the internal facet off which the light beam inducing the m-th spot is reflected. $(x_l''', y_l''')$ and $(x_m''', y_m''')$ are the computed coordinates (e.g. center points) of the l-th spot and the m-th spot, respectively. M is the number of (different) internal facet pairs. A radial deviation from parallelism may be obtained by computing max $\{\varepsilon_{lm}\}_{l, m>l}$.

According to some embodiments, deviations in pitch and in roll from the nominal orientation of each of the internal facets may additionally (or alternatively) be computed. To this end, an optical element characterized by an inclination angle σ equal to $\mu_{nom}+\Delta$ (and a first surface (of the optical element) not coated by an anti-reflective coating) may be used.

Lab Results

Figure 7A:
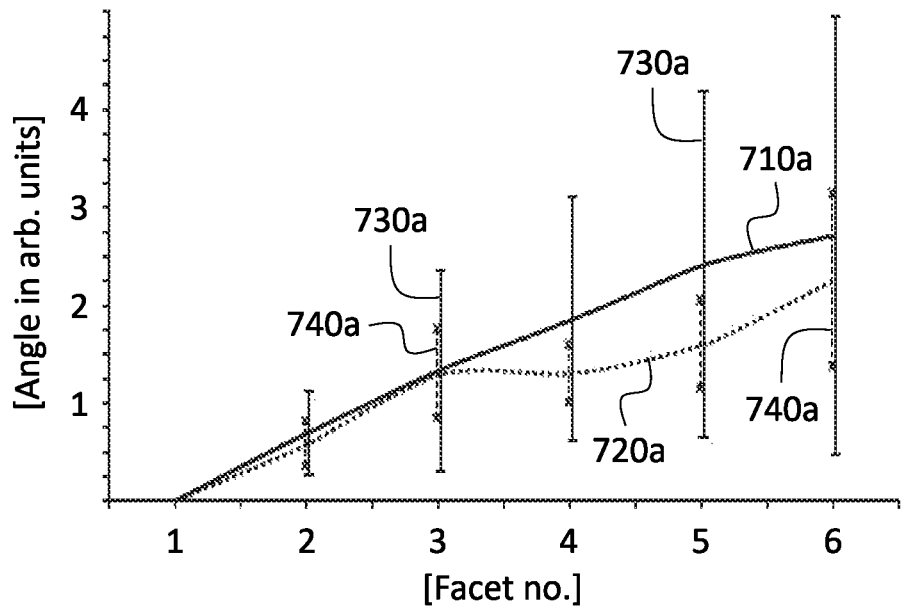
FIGS. 7A and 7B present lab results obtained using the disclosed methods and systems, according to some embodiments thereof.
Figure 7B:
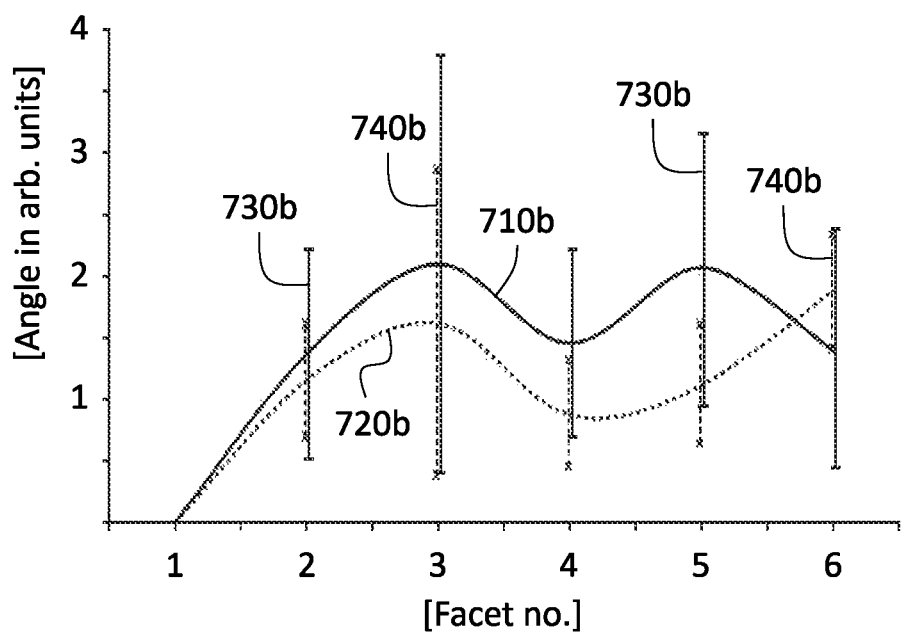

FIGS. 7A and 7B present lab results obtained using the disclosed methods and systems, according to some embodiments. Two reflective waveguides were inspected: a first waveguide and a second waveguide. Each of the waveguides included six internal facets. Referring to FIG. 7A, the x-axis enumerates the internal facets and the y-axis the magnitude of the angle between a reference internal facet (in this case the first internal facet, which is also the sidemost facet) and each of the other facets. A solid curve 710a pertains to the first waveguide and dashed curve 720a pertains to the second waveguide. Each of the curves was fitted (i.e. obtained using fitting techniques) based on the uncertainties in the (computed) magnitudes of the angles. Solid vertical bars 730a (not all of which are numbered) represent uncertainties pertaining to the first waveguide. Dashed vertical bars 740a (not all of which are numbered) represent uncertainties pertaining to the second waveguide.

Referring to FIG. 7B, the x-axis enumerates the internal facets and the y-axis the magnitude of the angle between a successive internal facet (i.e. the angle between the first internal facet and the second internal facet, the angle between the second internal facet and the third internal facet, and so on). A solid 710b curve pertains to the first waveguide and dashed curve 720b pertains to the second waveguide. Each of the curves was fitted based on the uncertainties (represented by vertical bars) in the (computed) magnitudes of the angles. Solid vertical bars 730b (not all of which are numbered) represent uncertainties pertaining to the first waveguide. Dashed vertical bars 740b (not all of which are numbered) represent uncertainties pertaining to the second waveguide.

As used herein, the terms "measuring" and "sensing" are used interchangeably. Similarly, the terms "sensed data" and "measurement data" (or "measured data") are used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out and/or occurring in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. An optical-based system for metrology of a sample having a substrate, with a refractive index $n_s$, and two or more internal facets, which are embedded in the substrate and nominally oriented at an acute nominal angle $\mu_{nom}$ relative to an external and flat surface of the sample, the system comprising a light transmissive optical element and an optical setup comprising a light source and a light sensing component, wherein the optical element has a refractive index about equal to $n_s$ and comprises an external and flat first surface and an external and flat second surface, which are opposite to one another and define an angle therebetween about equal to the nominal angle $\mu_{nom}$;

wherein the optical setup is configured to enable positioning the sample and/or the optical element, such that (i) the second surface of the optical element is parallel and adjacent to the surface of the sample, and (ii) when so positioned, light beams, generated by the light source, are incident on the first surface of the optical element about normally thereto;

wherein the optical setup is further configured to focus on the light sensing component returned light beams, so as to enable determination of angular deviation between the returned light beams; and wherein the returned light beams are obtained following passage of the incident light beams through the optical element, transmission thereof into the sample and reflection off the internal facets, repassage through the optical element, and exit out of the optical element via the first surface of the optical element, the angular deviation thus being indicative of a deviation from parallelism between the internal facets.

2. The system of claim 1, wherein the optical equipment comprises a collimating lens, or a collimating lens assembly, configured to collimate light beams generated by the light source, thereby preparing the incident light beams.

3. The system of claim 2, wherein the light source is a laser source.

4. The system of claim 1, wherein the optical equipment comprises a focusing lens, or a focusing lens assembly, configured to focus the exiting light beams on the light sensing component.

5. The system of claim 1, wherein the second surface of the optical element is inclined relative to the first surface of the optical element at an angle equal to $\mu_{nom}+\Delta$ with $|\Delta|$ being greater than about 0.1° and smaller than about 1°.

6. The system of claim 1, wherein the second surface of the optical element is inclined relative to the first surface of the optical element at the nominal angle $\mu_{nom}$.

7. The system of claim 6, wherein the first surface of the optical element is coated by an anti-reflective coating.

8. The system of claim 1, wherein the optical setup comprises orienting infrastructure configured for orienting the sample.

9. The system of claim 1, wherein the sample is a one-dimensional reflective waveguide or a two-dimensional reflective waveguide.

10. The system of claim 1, further comprising an autocollimator, which comprises the light source and, optionally, the light sensing component.

11. The system of claim 1, wherein the light sensing component comprises an image sensor configured to sense the returned light beams.

12. The system of claim 11, further comprising a computational module configured to compute the deviation from parallelism between the internal facets based on sensed data of the returned light beams obtained by the image sensor.

13. The system of claim 12, wherein the sensed data pertaining to each returned light beam comprises measured intensities of pixels making up a respective spot formed by the returned light beam on the image sensor.

14. The system of claim 12, wherein the computational module is configured to, as part of computing the deviation from parallelism between the internal facets, compute angular deviations between the returned light beams.

15. The system of claim 12, wherein the computing the deviation from parallelism comprises computing $\varepsilon_{avg}$ and/or $\varepsilon_{max}$, wherein $\varepsilon_{avg}$ is equal to $$\frac{1}{M}\sum\nolimits_{i,j>i}\varepsilon_{ij}.$$

and $\varepsilon_{max}$ is equal to $\max\{\varepsilon_{ij}\}_{i,\ j>i}$ or $\sqrt{(\max\{x_i\}_i-\min\{x_i\}_i)^2+(\max\{y_i\}_i-\min\{y_i\}_i)^2}/(2n_s\cdot f)$ with $\varepsilon_{ij}=\sqrt{(x_i-x_j)^2+(y_i-y_j)^2}/(2n_s\cdot f)$, $\{(x_k, y_k)\}_{k=1}^{N}$ being a set of two-dimensional vectors specifying locations of an i-th and j-th spot on the image sensor, N is a number of the internal facets, $M=N\cdot(N-1)/2$, and f is a focal length of a focusing lens or a focusing lens assembly configured to focus the returned light beams on the image sensor.

16. The system of claim 12, wherein the optical setup further comprises a translatable slitted or apertured optical mask, and/or a plurality of shutters, configured to enable inspecting the internal facets one at a time, and wherein the computational module is configured to compute deviations from parallelism between pairs of internal facets, from the plurality of internal facets.

17. The system of claim 16, wherein the computing of the deviations from parallelism between the pairs of internal facets comprises computing deviations in pitch $\{\varepsilon_{ij,\ p}\}_{i,j}$ and/or in roll $\{\varepsilon_{ij,\ r}\}_{i,j}$ between the internal facets in in each of the pairs of internal facets, wherein the indices i and j range over distinct internal facet pairs, and $\varepsilon_{ij,\ p}$ and $\varepsilon_{ij,\ r}$ are deviations in pitch and in roll, respectively, between an i-th and a j-th of the internal facets.

18. The system of claim 17, wherein the $\varepsilon_{ij,\ p}$ and the $\varepsilon_{ij,\ r}$ are computed via $\varepsilon_{ij,\ p}=\delta_{ij,\ p}/(2n_s)=(x_i-x_j)/(2n_s\cdot f)$ and $\varepsilon_{ij,\ r}=\delta_{ij,\ r}/(2n_s)=(y_i-y_j)/(2n_s\cdot j)$, respectively, wherein $\delta_{ij,\ p}$ is a deviation in pitch between an i-th of the returned light beams, induced by reflection off the i-th internal facet, and a j-th of the returned light beams, induced by reflection off the j-th internal facet, $\delta_{ij,\ r}$ is a deviation in roll between the i-th of the returned light beams and the j-th of the returned light beams, $\{(x_k, y_k)\}_{k=1}^{N}$ is a set of two-dimensional vectors specifying locations of the spots on the image sensor induced by the returned light beams, the index enumerating the light beam, N is a number of the internal facets, and f is a focal length of a focusing lens or a focusing lens assembly configured to focus the returned light beams on the image sensor.

19. The system of claim 1, wherein the light sensing component is or comprises a camera.

20. The system of claim 1, wherein the light sensing component comprises an eyepiece assembly comprising a graduated reticle.

21. The system of claim 1, wherein the optical setup further comprises a translatable slitted or apertured optical mask, and/or a plurality of shutters, configured to enable inspecting the internal facets one at a time.

\* \* \* \* \*